(12) United States Patent
Suzuki et al.

(10) Patent No.: US 10,525,794 B2
(45) Date of Patent: Jan. 7, 2020

(54) VEHICLE AIR CONDITIONING DEVICE

(71) Applicant: Sanden Holdings Corporation, Isesaki-shi, Gunma (JP)

(72) Inventors: Kenichi Suzuki, Isesaki (JP); Ryo Miyakoshi, Isesaki (JP)

(73) Assignee: Sanden Holdings Corporation, Isesaki-shi, Gunma (JP)

( * ) Notice: Subject to any disclaimer, the term of this patent is extended or adjusted under 35 U.S.C. 154(b) by 1108 days.

(21) Appl. No.: 14/786,962

(22) PCT Filed: Apr. 22, 2014

(86) PCT No.: PCT/JP2014/061266
§ 371 (c)(1),
(2) Date: Jan. 20, 2016

(87) PCT Pub. No.: WO2014/175254
PCT Pub. Date: Oct. 30, 2014

(65) Prior Publication Data
US 2016/0185185 A1 Jun. 30, 2016

(30) Foreign Application Priority Data

Apr. 26, 2013 (JP) .................................. 2013-093651

(51) Int. Cl.
*B60H 1/22* (2006.01)
*B60H 1/00* (2006.01)
(Continued)

(52) U.S. Cl.
CPC ....... *B60H 1/2218* (2013.01); *B60H 1/00385* (2013.01); *B60H 1/00392* (2013.01);
(Continued)

(58) Field of Classification Search
CPC ...... B60H 2001/224; B60H 2001/2265; B60H 1/00978
See application file for complete search history.

(56) References Cited

U.S. PATENT DOCUMENTS

2003/0010487 A1\* 1/2003 Ieda .................... B60H 1/00428
165/202
2005/0178523 A1\* 8/2005 Itoh .................... B60H 1/00385
165/42
(Continued)

FOREIGN PATENT DOCUMENTS

JP 11-198638 A 7/1999
JP 2000-33816 A 2/2000
(Continued)

OTHER PUBLICATIONS

Japan Patent Office, International Search Report for Application No. PCT/JP2014/061266, dated Aug. 5, 2014.
(Continued)

*Primary Examiner* — Avinash A Savani
*Assistant Examiner* — Deepak A Deean
(74) *Attorney, Agent, or Firm* — Baker Botts L.L.P.

(57) ABSTRACT

There is disclosed an air conditioning device of a so-called heat pump system which efficiently and comfortably heats a vehicle interior. In a vehicle air conditioning device 1, a controller executes a heating mode in which a refrigerant discharged from a compressor 2 radiates heat in a radiator 4 and the refrigerant by which heat has been radiated is decompressed and then absorbs heat in an outdoor heat exchanger 7. The vehicle air conditioning device includes a heating medium circulating circuit 23 to heat air to be supplied from an air flow passage 3 into the vehicle interior, and the controller executes the heating by a heating medium-air heat exchanger 40 of the heating medium circulating
(Continued)

circuit 23, when a heating capability by the radiator 4 runs short.

17 Claims, 19 Drawing Sheets

(51) Int. Cl.
*B60L 1/02* (2006.01)
*B60H 1/14* (2006.01)
(52) U.S. Cl.
CPC ......... *B60H 1/00921* (2013.01); *B60H 1/143* (2013.01); *B60L 1/02* (2013.01); *B60H 2001/00949* (2013.01); *B60H 2001/224* (2013.01); *B60H 2001/2237* (2013.01); *B60H 2001/2256* (2013.01); *B60H 2001/2265* (2013.01)

(56) References Cited

U.S. PATENT DOCUMENTS

| | | | |
|---|---|---|---|
| 2008/0041071 A1* | 2/2008 | Itoh | B60H 1/00342 62/79 |
| 2009/0188266 A1 | 7/2009 | Hung et al. | |
| 2011/0016896 A1* | 1/2011 | Oomura | B60H 1/00785 62/155 |
| 2012/0240604 A1* | 9/2012 | Choi | B60H 1/00921 62/79 |
| 2012/0240608 A1* | 9/2012 | Ito | B60H 1/00428 62/132 |
| 2013/0055751 A1* | 3/2013 | Inaba | B60H 1/2218 62/498 |
| 2013/0139528 A1* | 6/2013 | Katayama | B60H 1/00921 62/81 |

FOREIGN PATENT DOCUMENTS

| | | |
|---|---|---|
| JP | 2002-240539 A | 8/2002 |
| JP | 2007-278624 A | 10/2007 |
| JP | 3985384 B2 | 10/2007 |
| JP | 2012-176658 A | 9/2012 |

OTHER PUBLICATIONS

Japan Patent Office, Notification of Reasons for Refusal for Application No. JP 2013-093651, dated Nov. 7, 2016.
The State Intellectual Property Office of Peoples Republic of China, The First Office Action issued in Application No. CN 201480023659.7, dated Sep. 28, 2016.

* cited by examiner

VEHICLE AIR CONDITIONING DEVICE

CROSS-REFERENCE TO RELATED APPLICATIONS

This application is a U.S. National Stage Patent Application under 35 U.S.C. § 371 of International Patent Application No. PCT/JP2014/061266, filed on Apr. 22, 2014, which claims the benefit of Japanese Patent Application No. JP 093651/2013, filed on Apr. 25, 2013, the disclosures of each of which are incorporated herein by reference in their entirety.

TECHNICAL FIELD

The present invention relates to an air conditioning device of a heat pump system which conditions air in a vehicle interior, and more particularly, it relates to an air conditioning device applicable to a hybrid car or an electric car.

BACKGROUND ART

Due to actualization of environmental problems in recent years, hybrid cars and electric cars have spread. Furthermore, as an air conditioning device which is applicable to such a vehicle, there has been developed an air conditioning device which includes a compressor to compress and discharge a refrigerant, a radiator (a condenser) disposed on a vehicle interior side to let the refrigerant radiate heat, a heat absorber (an evaporator) disposed on the vehicle interior side to let the refrigerant absorb heat, and an outdoor heat exchanger disposed outside the vehicle interior to let the refrigerant radiate or absorb heat, and which changes and executes respective modes such as a heating mode in which the refrigerant discharged from the compressor radiates heat in the radiator and the refrigerant by which heat has been radiated in this radiator absorbs heat in the outdoor heat exchanger, a dehumidifying mode in which the refrigerant discharged from the compressor radiates heat in the radiator and the refrigerant by which heat has been radiated in the radiator absorbs heat in the heat absorber, and a cooling mode in which the refrigerant discharged from the compressor radiates heat in the outdoor heat exchanger and absorbs heat in the heat absorber (e.g., see Patent Document 1).

Additionally, in Patent Document 1, there is disposed an injection circuit which distributes the refrigerant discharged from the radiator, decompresses this distributed refrigerant, performs heat exchange between this refrigerant and the refrigerant discharged from the radiator, and then returns the refrigerant to the middle of compression by the compressor, whereby the refrigerant to be discharged from the compressor is increased, and a heating capability by the radiator improves.

CITATION LIST

Patent Documents

Patent Document 1: Japanese Patent No. 3985384

SUMMARY OF THE INVENTION

Problems to be Solved by the Invention

However, in such an air conditioning device as described above, when an outdoor heat exchanger is frosted, heat cannot be absorbed from outdoor air, and hence, there is the problem that a required heating capability cannot be obtained. In addition, a temperature of a refrigerant discharged from a radiator is low, and hence, an amount of heat exchange between the refrigerant and the distributed and decompressed refrigerant also decreases. Therefore, for the purpose of injecting a gas to the middle of compression of a compressor, there is a limit to increase of an amount of the refrigerant allowed to flow through an injection circuit, and the refrigerant to be discharged from the compressor cannot sufficiently be increased. As a result, there is the disadvantage that a heating capability cannot sufficiently be obtained.

The present invention has been developed to solve such conventional technical problems, and an object thereof is to efficiently and comfortably heat a vehicle interior in an air conditioning device of a so-called heat pump system.

Means for Solving the Problems

A vehicle air conditioning device of the present invention includes a compressor which compresses a refrigerant, an air flow passage through which air to be supplied into a vehicle interior flows, a radiator which lets the refrigerant radiate heat to heat the air to be supplied from the air flow passage into the vehicle interior, a heat absorber which lets the refrigerant absorb heat to cool the air to be supplied from the air flow passage into the vehicle interior, an outdoor heat exchanger disposed outside the vehicle interior to let the refrigerant radiate or absorb heat, and control means, this control means being configured to execute at least a heating mode in which the refrigerant discharged from the compressor radiates heat in the radiator and the refrigerant by which heat has been radiated is decompressed and then absorbs heat in the outdoor heat exchanger, the vehicle air conditioning device including auxiliary heating means for heating the air to be supplied from the air flow passage into the vehicle interior, and being characterized in that the control means executes the heating by the auxiliary heating means, when a heating capability by the radiator runs short.

The vehicle air conditioning device of the invention of claim 2 is characterized in that in the above invention, the control means compares a required heating capability Qtgt which is the heating capability required for the radiator with a heating capability Qhp to be generated by the radiator, and complements a shortage of the heating capability Qhp to the required heating capability Qtgt by the heating of the auxiliary heating means.

The vehicle air conditioning device of the invention of claim 3 is characterized in that in the above invention, the heating capability Qhp is a heating capability in non-frosting QhpNI to be generated by the radiator when the outdoor heat exchanger is not frosted, and a shortage of the heating capability in non-frosting QhpNI to the required heating capability Qtgt is complemented by the heating of the auxiliary heating means.

The vehicle air conditioning device of the invention of claim 4 is characterized in that in the above invention, the control means adds a difference between the heating capability in non-frosting QhpNI and an actual heating capability Qhpr to be actually generated by the radiator to perform the heating by the auxiliary heating means, when the actual heating capability Qhpr is smaller than the heating capability in non-frosting QhpNI.

The vehicle air conditioning device of the invention of claim 5 is characterized in that in the invention of claim 3 or claim 4, the control means stops the compressor and controls the auxiliary heating means in accordance with the required heating capability Qtgt, when an actual heating capability Qhpr to be actually generated by the radiator is smaller than the heating capability in non-frosting QhpNI and a difference between the heating capability in non-frosting QhpNI and the actual heating capability Qhpr is larger than a predetermined value.

The vehicle air conditioning device of the invention of claim 6 is characterized in that in the invention of claim 4 or claim 5, the control means calculates the actual heating capability Qhpr on the basis of one of indexes indicating a temperature of the air flowing out from the radiator and a volume of the air passing the radiator, respectively, or a combination of the indexes, and indexes indicating specific heat of the air flowing into the radiator and a density of the air.

The vehicle air conditioning device of the invention of claim 7 is characterized in that in the inventions of claim 3 to claim 6, the control means calculates the required heating capability Qtgt on the basis of one of indexes indicating a temperature of the air flowing into the radiator, a temperature of the air flowing out from the radiator and a volume of the air passing the radiator, respectively, or any combination of the indexes, and indexes indicating specific heat of the air flowing into the radiator and a density of the air, and calculates the heating capability in non-frosting QhpNI on the basis of one of indexes indicating an outdoor air temperature, a refrigerant flow rate, an air volume in the air flow passage, a velocity, a volume of the air passing the outdoor heat exchanger, a voltage of an outdoor blower which passes the air through the outdoor heat exchanger, a temperature of the heat absorber, a number of revolution of the compressor, a refrigerant pressure of an outlet of the radiator, a refrigerant temperature of the radiator outlet, a refrigerant pressure of an inlet of the radiator, and a refrigerant temperature of the radiator inlet, respectively, or any combination of the indexes.

The vehicle air conditioning device of the invention of claim 8 is characterized in that in the above respective inventions, the radiator is disposed outside the air flow passage, and the auxiliary heating means is constituted of a heating medium circulating circuit which has a heating medium-refrigerant heat exchanger to perform heat exchange with the radiator, a heating medium-air heat exchanger disposed in the air flow passage, an electric heater, and circulating means and which circulates a heating medium heated by the heating medium-refrigerant heat exchanger and/or the electric heater through the heating medium-air heat exchanger by the circulating means.

The vehicle air conditioning device of the invention of claim 9 is characterized in that in the inventions of claim 1 to claim 7, the auxiliary heating means is constituted of an electric heater disposed in the air flow passage to heat the air to be supplied into the vehicle interior.

The vehicle air conditioning device of the invention of claim 10 is characterized in that in the inventions of claim 1 to claim 7, the radiator is disposed in the air flow passage, and the auxiliary heating means is constituted of a heating medium circulating circuit which has a heating medium-air heat exchanger disposed in the air flow passage, an electric heater, and circulating means and circulates a heating medium heated by the electric heater through the heating medium-air heat exchanger by the circulating means.

The vehicle air conditioning device of the invention of claim 11 is characterized in that in the above invention, the heating medium circulating circuit has a heating medium-refrigerant heat exchanger which collects heat from the refrigerant passed through the radiator.

The vehicle air conditioning device of the invention of claim 12 is characterized in that in the invention of claim 10 or claim 11, the control means executes a preliminary operation to start the heating by the heating medium circulating circuit, when the heating capability by the radiator does not run short, but a difference between a heating capability in non-frosting QhpNI to be generated by the radiator when the outdoor heat exchanger is not frosted and a required heating capability Qtgt which is the heating capability required for the radiator is reduced to a predetermined value.

The vehicle air conditioning device of the invention of claim 13 is characterized in that in the above invention, the control means lowers the heating capability by the radiator as much as the heating by the heating medium circulating circuit, during the execution of the preliminary operation.

The vehicle air conditioning device of the invention of claim 14 is characterized in that in the invention of claim 12 or claim 13, the control means limits an amount of a heating medium to be circulated through the heating medium-air heat exchanger, when a temperature of the heating medium flowing through the heating medium circulating circuit is lower than a predetermined value during the execution of the preliminary operation.

The vehicle air conditioning device of the invention of claim 15 is characterized in that in the inventions of claim 9 to claim 14, the electric heater or the heating medium-air heat exchanger is disposed on a downstream side of the radiator to the flow of the air of the air flow passage.

The vehicle air conditioning device of the invention of claim 16 is characterized in that in the inventions of claim 9 to claim 14, the electric heater or the heating medium-air heat exchanger is disposed on an upstream side of the radiator to the flow of the air of the air flow passage.

Advantageous Effect of the Invention

According to the present invention, in a vehicle air conditioning device including a compressor which compresses a refrigerant, an air flow passage through which air to be supplied into a vehicle interior flows, a radiator which lets the refrigerant radiate heat to heat the air to be supplied from the air flow passage into the vehicle interior, a heat absorber which lets the refrigerant absorb heat to cool the air to be supplied from the air flow passage into the vehicle interior, an outdoor heat exchanger disposed outside the vehicle interior to let the refrigerant radiate or absorb heat, and control means, this control means being configured to execute at least a heating mode in which the refrigerant discharged from the compressor radiates heat in the radiator and the refrigerant by which heat has been radiated is decompressed and then absorbs heat in the outdoor heat exchanger, there is disposed auxiliary heating means for heating the air to be supplied from the air flow passage into the vehicle interior, and the control means executes the heating by the auxiliary heating means, when a heating capability by the radiator runs short. Therefore, when the heating capability by the radiator runs short as in a case where the outdoor heat exchanger is frosted or the like, the auxiliary heating means can heat the air to be supplied into the vehicle interior to complement the heating capability, heating in the vehicle interior can comfortably be realized, and the frosting of the outdoor heat exchanger can be inhibited.

Additionally, the heating by the auxiliary heating means is executed under a situation where the heating capability by the radiator runs short, and hence deterioration of an efficiency due to the heating by the auxiliary heating means can be minimized. Consequently, especially in an electric car, it is possible to effectively inhibit the disadvantage that a cruising range decreases.

In this case, as in the invention of claim 2, the control means compares a required heating capability Qtgt which is the heating capability required for the radiator with a heating capability Qhp to be generated by the radiator, and complements a shortage of the heating capability Qhp to the required heating capability Qtgt by the heating of the auxiliary heating means, so that the comfortable heating in the vehicle interior and inhibition of efficiency deterioration can effectively be performed.

For example, as in the invention of claim 3, the heating capability Qhp is defined as a heating capability in non-frosting QhpNI to be generated by the radiator when the outdoor heat exchanger is not frosted, and a shortage of the heating capability in non-frosting QhpNI to the required heating capability Qtgt is complemented by the heating of the auxiliary heating means, so that it can be grasped whether or not the heating capability of the radiator runs short in a stage before the outdoor heat exchanger is frosted, the heating by the auxiliary heating means can rapidly be started, and the heating in the vehicle interior can more comfortably be realized.

At this time, as in the invention of claim 4, the control means adds a difference between the heating capability in non-frosting QhpNI and an actual heating capability Qhpr to be actually generated by the radiator to perform the heating by the auxiliary heating means, when the actual heating capability Qhpr is smaller than the heating capability in non-frosting QhpNI. In this case, when the outdoor heat exchanger is frosted and the actual heating capability Qhpr is lower than the heating capability in non-frosting QhpNI, the lowering can be complemented by the auxiliary heating means, and comfort can further improve.

Additionally, as in the invention of claim 5, the control means stops the compressor and controls the auxiliary heating means in accordance with the required heating capability Qtgt, when an actual heating capability Qhpr to be actually generated by the radiator is smaller than the heating capability in non-frosting QhpNI and a difference between the heating capability in non-frosting QhpNI and the actual heating capability Qhpr is larger than a predetermined value. In this case, a degree of progress of the frosting onto the outdoor heat exchanger can be grasped, and the heating can be switched to the vehicle interior heating only by the auxiliary heating means when the frosting disadvantageously progresses. In consequence, it is possible to continuously perform the heating in the vehicle interior by the auxiliary heating means while preventing further growth of the frosting of the outdoor heat exchanger or promoting melting of the frosting.

In this case, as in the invention of claim 6, the control means calculates the actual heating capability Qhpr on the basis of one of indexes indicating a temperature of the air flowing out from the radiator and a volume of the air passing the radiator, respectively, or a combination of the indexes, and indexes indicating specific heat of the air flowing into the radiator and a density of the air. As in the invention of claim 7, the control means calculates the required heating capability Qtgt on the basis of one of indexes indicating a temperature of the air flowing into the radiator, a temperature of the air flowing out from the radiator and a volume of the air passing the radiator, respectively, or any combination of the indexes, and indexes indicating specific heat of the air flowing into the radiator and a density of the air, and calculates the heating capability in non-frosting QhpNI on the basis of one of indexes indicating an outdoor air temperature, a refrigerant flow rate, an air volume in the air flow passage, a velocity, a volume of the air passing the outdoor heat exchanger, a voltage of an outdoor blower which passes the air through the outdoor heat exchanger, a temperature of the heat absorber, a number of revolution of the compressor, a refrigerant pressure of an outlet of the radiator, a refrigerant temperature of the radiator outlet, a refrigerant pressure of an inlet of the radiator, and a refrigerant temperature of the radiator inlet, respectively, or any combination of the indexes. In consequence, it is possible to more accurately control judgment of the heating capability by the radiator and the heating by the auxiliary heating means due to the shortage of the heating capability.

It is to be noted that as in the invention of claim 8, the radiator is disposed outside the air flow passage, and the auxiliary heating means is constituted of a heating medium circulating circuit which has a heating medium-refrigerant heat exchanger to perform heat exchange with the radiator, a heating medium-air heat exchanger disposed in the air flow passage, an electric heater, and circulating means and which circulates a heating medium heated by the heating medium-refrigerant heat exchanger and/or the electric heater through the heating medium-air heat exchanger by the circulating means. In this constitution, electrically safer heating in the vehicle interior can be realized. However, as in the invention of claim 9, the auxiliary heating means may be constituted of an electric heater disposed in the air flow passage to heat the air to be supplied into the vehicle interior.

Additionally, as in the invention of claim 10, the radiator is disposed in the air flow passage, and the auxiliary heating means is constituted of a heating medium circulating circuit which has a heating medium-air heat exchanger disposed in the air flow passage, an electric heater, and circulating means and circulates a heating medium heated by the electric heater through the heating medium-air heat exchanger by the circulating means. Also in this case, electric safety improves.

Additionally, as in the invention of claim 11, in the heating medium circulating circuit, there is disposed a heating medium-refrigerant heat exchanger which collects heat from the refrigerant passed through the radiator, whereby the heat which the refrigerant discharged from the radiator has is collected by the heating medium flowing in the heating medium circulating circuit to be conveyed to the heating medium-air heat exchanger, so that it is possible to more efficiently support the heating.

Furthermore, in the case of the above heating medium circulating circuit, as in the invention of claim 12, the control means executes a preliminary operation to start the heating by the heating medium circulating circuit, when the heating capability by the radiator does not run short, but a difference between a heating capability in non-frosting QhpNI to be generated by the radiator when the outdoor heat exchanger is not frosted and a required heating capability Qtgt which is the heating capability required for the radiator is reduced to a predetermined value. In this case, when the shortage of the heating capability by the radiator is predicted, it is possible to previously warm the heating medium in the heating medium circulating circuit, and it is possible to rapidly complement the heating capability by use of the heating medium circulating circuit.

Additionally, in this case, as in the invention of claim 13, the control means lowers the heating capability by the radiator as much as the heating by the heating medium circulating circuit, during the execution of the preliminary operation, and in this case, it is possible to eliminate the disadvantage that the heating capability enhances more than necessary during the preliminary operation of the heating medium circulating circuit.

Furthermore, as in the invention of claim 14, the control means limits an amount of a heating medium to be circulated through the heating medium-air heat exchanger, when a temperature of the heating medium flowing through the heating medium circulating circuit is lower than a predetermined value during the execution of the preliminary operation. Consequently, while inhibiting the circulation to the heating medium-air heat exchanger in a situation where the temperature of the heating medium in the heating medium circulating circuit is still low and preventing a temperature fall of the air to be supplied into the vehicle interior, a temperature rise of the heating medium is promoted. Furthermore, when the heating capability by the radiator runs short, the air in the air flow passage can rapidly be heated by the heating medium-air heat exchanger to perform the heating.

In this case, when the electric heater or the heating medium-air heat exchanger is disposed on a downstream side of the radiator to the flow of the air of the air flow passage as in the invention of claim 15, the air heated by the electric heater or the heating medium-air heat exchanger does not flow into the radiator, and deterioration of an operation efficiency due to deterioration of a heat exchange performance in the radiator can be prevented, as in a case where the electric heater or the heating medium-air heat exchanger is disposed on an upstream side.

In addition, when the heating medium-air heat exchanger is disposed on an air downstream side of the radiator, there is the fear that the temperature of the air to be supplied into the vehicle interior falls in an initial stage after start of energization to the electric heater or in the situation where the temperature of the heating medium in the heating medium circulating circuit is still low, but the control is executed as in the abovementioned invention of claim 14, so that the fear can be eliminated.

Conversely, when the electric heater or the heating medium-air heat exchanger is disposed on the upstream side of the radiator to the flow of the air of the air flow passage as in the invention of claim 16, the deterioration of the operation efficiency is feared as described above, but the problem does not occur at the start of the energization to the electric heater or due to the low temperature of the heating medium in the heating medium circulating circuit. In addition, coordinated heating with the radiator is easily performed, and such a preliminary operation as described above is not required.

MODE FOR CARRYING OUT THE INVENTION

Hereinafter, embodiments of the present invention will be described in detail with reference to the drawings.

Figure 1:
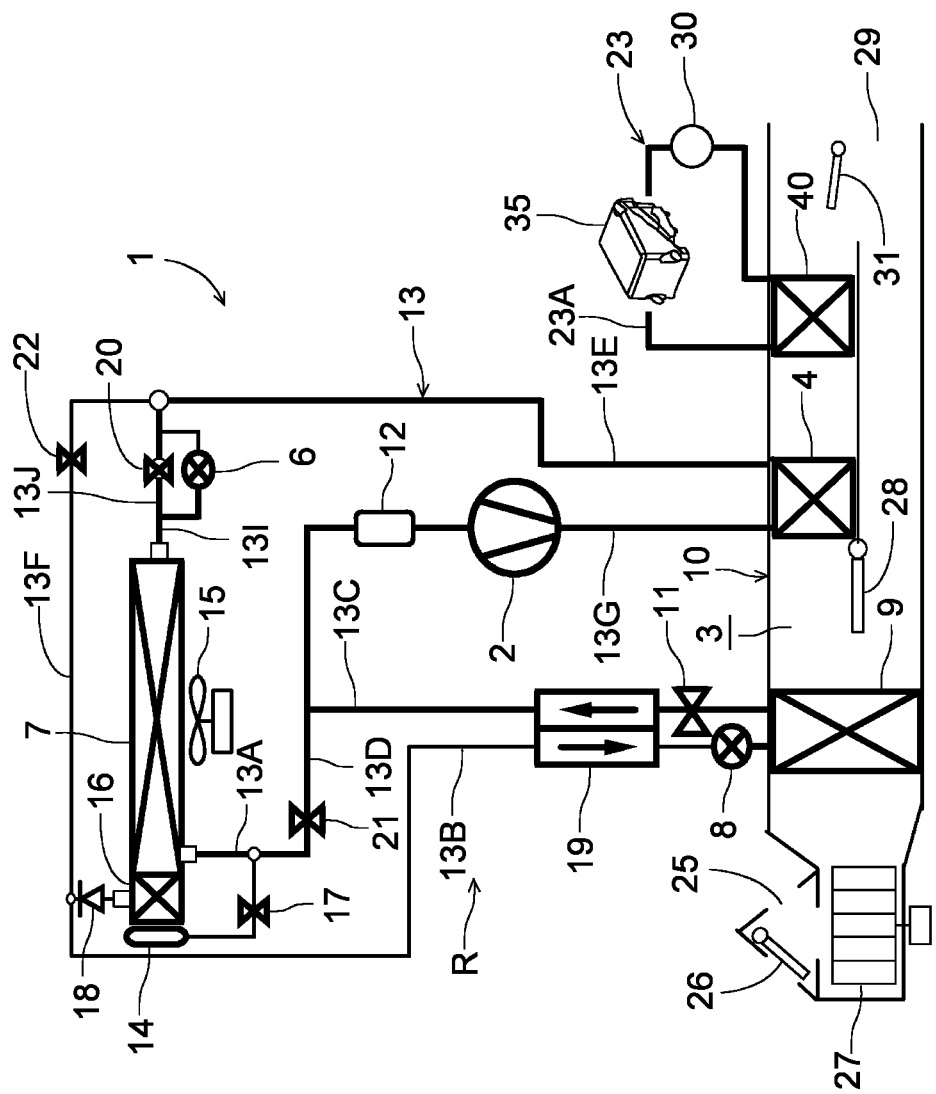
FIG. 1 is a constitutional view of a vehicle air conditioning device of one embodiment to which the present invention is applied.

FIG. 1 shows a constitutional view of a vehicle air conditioning device 1 of one embodiment of the present invention. A vehicle of the embodiment to which the present invention is applied is an electric car (EV) in which an engine (an internal combustion engine) is not mounted, and runs by driving an electric motor for running by a power charged in a battery (which is not shown), and the vehicle air conditioning device 1 of the present invention is driven by the power of the battery. That is, in the electric car in which heating cannot be performed by waste heat of the engine, the vehicle air conditioning device 1 of the embodiment performs the heating by a heat pump operation in which a refrigerant circuit is used, and further selectively executes respective operation modes of dehumidifying and heating, cooling and dehumidifying, cooling, and the like.

It is to be noted that the vehicle is not limited to the electric car, and the present invention is also effective for a so-called hybrid car in which the engine is used together with the electric motor for the running, and is, needless to say, further applicable also to a usual car which runs by the engine.

The vehicle air conditioning device 1 of the embodiment performs air conditioning (heating, cooling, dehumidifying, and ventilation) in the electric car, and there are successively connected, by a refrigerant pipe 13, an electric compressor 2 which compresses a refrigerant, a radiator 4 disposed in an air flow passage 3 of an HVAC unit 10 in which air in the vehicle interior is passed and circulated, to let the high-temperature high-pressure refrigerant discharged from the compressor 2 flow inside via a refrigerant pipe 13G and radiate heat in the vehicle interior, an outdoor expansion valve 6 constituted of an electric valve which decompresses and expands the refrigerant during the heating, an outdoor heat exchanger 7 which performs heat exchange between the refrigerant and outdoor air to function as the radiator during the cooling and function as an evaporator during the heating, an indoor expansion valve 8 constituted of an electric valve which decompresses and expands the refrigerant, a heat absorber 9 disposed in the air flow passage 3 to let the refrigerant absorb heat from interior and exterior of the vehicle during the cooling and during the dehumidifying, an evaporation capability control valve 11 which regulates an evaporation capability in the heat absorber 9, an accumulator 12 and the like, so that a refrigerant circuit R is constituted. It is to be noted that in the outdoor heat exchanger 7, an outdoor blower 15 is disposed. The outdoor blower 15 forcibly passes the outdoor air through the outdoor heat exchanger 7 and performs the heat exchange between the outdoor air and the refrigerant, whereby the outdoor air is also passed through the outdoor heat exchanger 7 when the vehicle is stopped (i.e., a velocity VSP is 0 km/h).

In addition, the outdoor heat exchanger 7 has a receiver drier portion 14 and a subcooling portion 16 successively on a refrigerant downstream side, a refrigerant pipe 13A extended out from the outdoor heat exchanger 7 is connected to the receiver drier portion 14 via a solenoid valve (an opening/closing valve) 17 opened during the cooling, and an outlet of the subcooling portion 16 is connected to the indoor expansion valve 8 via a check valve 18. It is to be noted that the receiver drier portion 14 and the subcooling portion 16 structurally constitute a part of the outdoor heat exchanger 7, and an indoor expansion valve 8 side of the check valve 18 is a forward direction.

In addition, a refrigerant pipe 13B between the check valve 18 and the indoor expansion valve 8 is disposed in a heat exchange relation with a refrigerant pipe 13C extended out from the evaporation capability control valve 11 positioned on an outlet side of the heat absorber 9, and both the pipes constitute an internal heat exchanger 19. In consequence, the refrigerant flowing through the refrigerant pipe 13B into the indoor expansion valve 8 is cooled (subcooled) by the low-temperature refrigerant flowing out from the heat absorber 9 through the evaporation capability control valve 11.

In addition, the refrigerant pipe 13A extended out from the outdoor heat exchanger 7 is branched, and this branched refrigerant pipe 13D communicates to be connected to the refrigerant pipe 13C on the downstream side of the internal heat exchanger 19 via a solenoid valve (an opening/closing valve) 21 to be opened during heating. Furthermore, a refrigerant pipe 13E on an outlet side of the radiator 4 is branched before the outdoor expansion valve 6, and this branched refrigerant pipe 13F communicates to be connected to the refrigerant pipe 13B on the downstream side of the check valve 18 via a solenoid valve (an opening/closing valve) 22 to be opened during the dehumidifying.

In addition, a bypass pipe 13J is connected in parallel with the outdoor expansion valve 6, and in the bypass pipe 13J, there is disposed a solenoid valve (an opening/closing valve) 20 which is opened in a cooling mode and allows the refrigerant to flow and bypasses the outdoor expansion valve 6. It is to be noted that a pipe 131 is interposed between the outdoor expansion valve 6 and the solenoid valve 20, and the outdoor heat exchanger 7.

Additionally, in the air flow passage 3 on an air upstream side of the heat absorber 9, respective suction ports such as an outdoor air suction port and an indoor air suction port are formed (represented by a suction port 25 in FIG. 1), and in the suction port 25, a suction changing damper 26 is disposed to change the air to be introduced into the air flow passage 3 to indoor air which is air in the vehicle interior (an indoor air circulating mode) and outdoor air which is air outside the vehicle interior (an outdoor air introducing mode). Further, on an air downstream side of the suction changing damper 26, an indoor blower (a blower fan) 27 is disposed to supply the introduced indoor air or outdoor air to the air flow passage 3.

Additionally, in FIG. 1, 23 is a heating medium circulating circuit as auxiliary heating means disposed in the vehicle air conditioning device 1 of the embodiment. The heating medium circulating circuit 23 includes a circulating pump 30 constituting circulating means, a heating medium heating electric heater (shown by ECH in the drawing) 35, and a heating medium-air heat exchanger 40 disposed in the air flow passage 3 on the air downstream side of the radiator 4 to the flow of the air of the air flow passage 3, and these components are successively annularly connected by a heating medium pipe 23A. It is to be noted that as the heating medium to be circulated in the heating medium circulating circuit 23, for example, water, a refrigerant such as HFO-1234yf, a coolant or the like is employed.

Further, when the circulating pump 30 is operated and the heating medium heating electric heater 35 is energized to generate heat, the heating medium heated by the heating medium heating electric heater 35 is circulated through the heating medium-air heat exchanger 40. That is, the heating medium-air heat exchanger 40 of the heating medium circulating circuit 23 is a so-called heater core, and complements the heating in the vehicle interior. Thus, the heating medium circulating circuit 23 is employed, and hence, electric safety of a passenger can improve.

Additionally, in the air flow passage 3 on the air upstream side of the radiator 4, an air mix damper 28 is disposed to regulate a degree of flow of the indoor air or the outdoor air through the radiator 4. Further, in the air flow passage 3 on an air downstream side of the radiator 4, each outlet of foot, vent or defroster (represented by an outlet 29 in FIG. 1) is formed, and in the outlet 29, an outlet changing damper 31 is disposed to perform changing control of blowing of the air from each outlet mentioned above.

Figure 3:
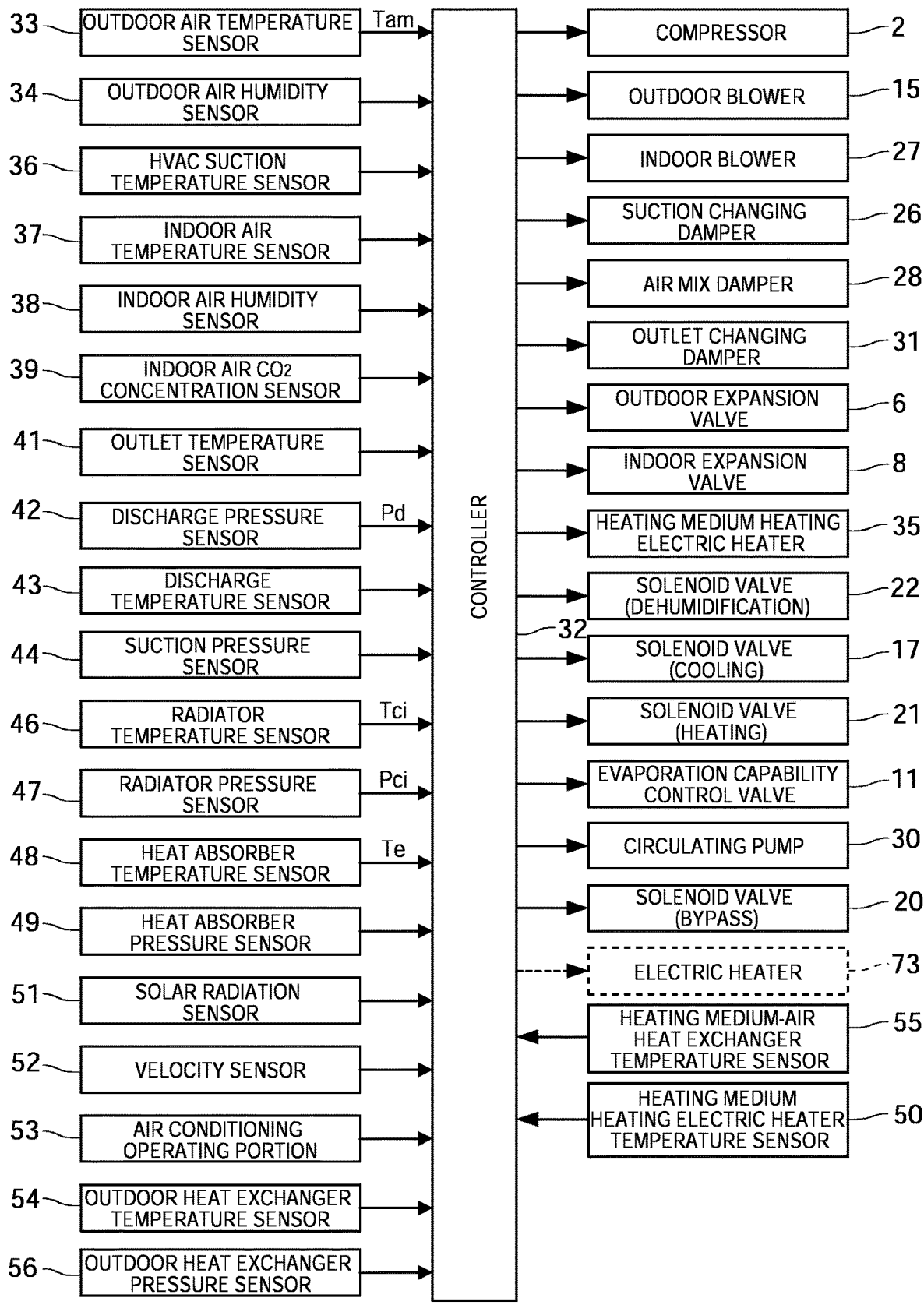
FIG. 3 is a block diagram of an electric circuit of a controller of the vehicle air conditioning device of FIG. 1.

Next, in FIG. 3, 32 is a controller (ECU) as control means constituted of a microcomputer, and an input of the controller 32 is connected to respective outputs of an outdoor air temperature sensor 33 which detects an outdoor air temperature of the vehicle, an outdoor air humidity sensor 34 which detects an outdoor air humidity, an HVAC suction temperature sensor 36 which detects a temperature of the air to be sucked from the suction port 25 to the air flow passage 3, an indoor air temperature sensor 37 which detects a temperature of the air in the vehicle interior (the indoor air), an indoor air humidity sensor 38 which detects a humidity of the air in the vehicle interior, an indoor air $CO_2$ concentration sensor 39 which detects a carbon dioxide concentration in the vehicle interior, an outlet temperature sensor 41 which detects a temperature of the air blown out from the outlet 29 into the vehicle interior, a discharge pressure sensor 42 which detects a pressure of the refrigerant discharged from the compressor 2, a discharge temperature sensor 43 which detects a temperature of the refrigerant discharged from the compressor 2, a suction pressure sensor 44 which detects a suction refrigerant pressure of the compressor 2, a radiator temperature sensor 46 which detects a temperature of the radiator 4 (the temperature of the air passed through the radiator 4 or the temperature of the radiator 4 itself), a radiator pressure sensor 47 which detects a refrigerant pressure of the radiator 4 (the pressure in the radiator 4 or the pressure of the refrigerant which has just flowed out from the radiator 4), a heat absorber temperature sensor 48 which detects a temperature of the heat absorber 9 (the temperature of the air passed through the heat absorber 9 or the temperature of the heat absorber 9 itself), a heat absorber pressure sensor 49 which detects a refrigerant pressure of the heat absorber 9 (the pressure in the heat absorber 9 or the pressure of the refrigerant which has just flowed out from the heat absorber 9), a solar radiation sensor 51 of, e.g., a photo sensor system to detect a solar radiation amount into the vehicle, a velocity sensor 52 to detect a moving speed of the vehicle (a velocity), an air conditioning operating portion 53 to set the changing of the predetermined temperature or the operation mode, an outdoor heat exchanger temperature sensor 54 which detects a temperature of the outdoor heat exchanger 7 (the temperature of the refrigerant which has just flowed out from the outdoor heat exchanger 7 or the temperature of the outdoor heat exchanger 7 itself), and an outdoor heat exchanger pressure sensor 56 which detects the refrigerant pressure of the outdoor heat exchanger 7 (the pressure of the refrigerant in the outdoor heat exchanger 7 or the refrigerant which has just flowed out from the outdoor heat exchanger 7).

In addition, the input of the controller 32 is further connected to respective outputs of a heating medium heating electric heater temperature sensor 50 which detects a temperature of the heating medium heating electric heater 35 of the heating medium circulating circuit 23 (the temperature of the heating medium immediately after heated by the heating medium heating electric heater 35 or a temperature of an unshown electric heater itself built in the heating medium heating electric heater 35), and a heating medium-air heat exchanger temperature sensor 55 which detects a temperature of the heating medium-air heat exchanger 40 (the temperature of the air passed through the heating medium-air heat exchanger 40 or the temperature of the heating medium-air heat exchanger 40 itself).

On the other hand, an output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, the respective solenoid valves 22, 17, 21 and 20, the circulating pump 30, the heating medium heating electric heater 35, and the evaporation capability control valve 11. Further, the controller 32 controls these components on the basis of the outputs of the respective sensors and the setting input by the air conditioning operating portion 53.

Next, an operation of the vehicle air conditioning device 1 of the embodiment having the abovementioned constitution will be described. In the embodiment, the controller 32 changes and executes respective roughly divided operation modes such as a heating mode, a dehumidifying and heating mode, an internal cycle mode, a dehumidifying and cooling mode, and a cooling mode. First, the flow of the refrigerant in each operation mode will be described.

(1) Flow of Refrigerant of Heating Mode

When the heating mode is selected by the controller 32 or a manual operation to the air conditioning operating portion 53, the controller 32 opens the solenoid valve 21 and closes the solenoid valve 17, the solenoid valve 22 and the solenoid valve 20. Furthermore, the compressor 2 and the respective blowers 15 and 27 are operated, and the air mix damper 28 has a state where the air blown out from the indoor blower 27 is passed through the radiator 4 and the heating medium-air heat exchanger 40. In consequence, the high-temperature high-pressure gas refrigerant discharged from the compressor 2 flows into the radiator 4. The air in the air flow passage 3 is passed through the radiator 4, and hence the air in the air flow passage 3 is heated by the high-temperature refrigerant in the radiator 4, whereas the refrigerant in the radiator 4 has the heat taken by the air and is cooled to condense and liquefy.

The refrigerant liquefied in the radiator 4 flows out from the radiator 4 and then flows through the refrigerant pipe 13E to reach the outdoor expansion valve 6. It is to be noted that an operation and a function of the heating medium circulating circuit 23 will be described later. The refrigerant flowing into the outdoor expansion valve 6 is decompressed and then flows into the outdoor heat exchanger 7. The refrigerant flowing into the outdoor heat exchanger 7 evaporates, and the heat is pumped up from the outdoor air passed by running or the outdoor blower 15. That is, the refrigerant circuit R becomes a heat pump (shown by HP in the drawing). Further, the low-temperature refrigerant flowing out from the outdoor heat exchanger 7 flows through the refrigerant pipe 13D and the solenoid valve 21 to flow from the refrigerant pipe 13C into the accumulator 12 in which gas liquid separation is performed, and then the gas refrigerant is sucked into the compressor 2, thereby repeating this circulation. The air heated in the radiator 4 is blown out from the outlet 29 through the heating medium-air heat exchanger 40, and hence the heating in the vehicle interior is performed.

The controller 32 controls a number of revolution of the compressor 2 on the basis of a high pressure of the refrigerant circuit R which is detected by the discharge pressure sensor 42 or the radiator pressure sensor 47, also controls a valve position of the outdoor expansion valve 6 on the basis of the temperature of the radiator 4 which is detected by the radiator temperature sensor 46 and the refrigerant pressure of the radiator 4 which is detected by the radiator pressure sensor 47, and controls a subcool degree of the refrigerant in the outlet of the radiator 4.

(2) Flow of Refrigerant of Dehumidifying and Heating Mode

Next, in the dehumidifying and heating mode, the controller 32 opens the solenoid valve 22 in the above state of the heating mode. In consequence, a part of the condensed refrigerant flowing through the radiator 4 and the refrigerant pipe 13E is distributed, and flows through the solenoid valve 22 to flow from the refrigerant pipes 13F and 13B through the internal heat exchanger 19, thereby reaching the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by a heat absorbing operation at this time, and hence the air is cooled and dehumidified.

The refrigerant evaporated in the heat absorber 9 flows through the evaporation capability control valve 11 and the internal heat exchanger 19 to join the refrigerant from the refrigerant pipe 13D in the refrigerant pipe 13C, and then flows through the accumulator 12 to be sucked into the compressor 2, thereby repeating this circulation. The air dehumidified in the heat absorber 9 is reheated in a process of passing the radiator 4, and hence the dehumidifying and heating in the vehicle interior are performed. The controller 32 controls the number of revolution of the compressor 2 on the basis of the high pressure of the refrigerant circuit R which is detected by the discharge pressure sensor 42 or the radiator pressure sensor 47, and also controls the valve position of the outdoor expansion valve 6 on the basis of the temperature of the heat absorber 9 which is detected by the heat absorber temperature sensor 48.

(3) Flow of Refrigerant of Internal Cycle Mode

Next, in the internal cycle mode, the controller 32 shuts off the outdoor expansion valve 6 in the above state of the dehumidifying and heating mode (a shut off position), and also closes the solenoid valve 21. The outdoor expansion valve 6 and the solenoid valve 21 are closed, whereby inflow of the refrigerant into the outdoor heat exchanger 7 and outflow of the refrigerant from the outdoor heat exchanger 7 are obstructed, and hence all the condensed refrigerant flowing through the radiator 4 and the refrigerant pipe 13E flows through the solenoid valve 22 to the refrigerant pipe 13F. Further, the refrigerant flowing through the refrigerant pipe 13F flows from the refrigerant pipe 13B through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19, the refrigerant pipe 13C and the accumulator 12 to be sucked into the compressor 2, thereby repeating this circulation. The air dehumidified in the heat absorber 9 is reheated in the process of passing the radiator 4, and hence the dehumidifying and heating in the vehicle interior are performed. However, in this internal cycle mode, the refrigerant is circulated between the radiator 4 (heat radiation) and the heat absorber 9 (heat absorption) which are present in the air flow passage 3 on an indoor side, and hence the heat is not pumped up from the outdoor air, but a heating capability for consumed power of the compressor 2 is exerted. The whole amount of the refrigerant flows through the heat absorber 9 which exerts a dehumidifying operation, and hence as compared with the above dehumidifying and heating mode, a dehumidifying capability is high, but the heating capability lowers.

The controller 32 controls the number of revolution of the compressor 2 on the basis of the temperature of the heat absorber 9 or the abovementioned high pressure of the refrigerant circuit R. At this time, the controller 32 selects a smaller compressor target number of revolution from compressor target numbers of revolution obtained by calculations from the temperature of the heat absorber 9 or the high pressure, to control the compressor 2.

(4) Flow of Refrigerant of Dehumidifying and Cooling Mode

Next, in the dehumidifying and cooling mode, the controller 32 opens the solenoid valve 17 and closes the solenoid valve 21, the solenoid valve 22 and the solenoid valve 20. Furthermore, the compressor 2 and the respective blowers 15 and 27 are operated, and the air mix damper 28 has the state where the air blown out from the indoor blower 27 is passed through the radiator 4 and the heating medium-air heat exchanger 40. In consequence, the high-temperature high-pressure gas refrigerant discharged from the compressor 2 flows into the radiator 4. Through the radiator 4, the air in the air flow passage 3 is passed, and hence the air in the air flow passage 3 is heated by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled so that the valve tends to be open, to flow into the outdoor heat exchanger 7. The refrigerant flowing into the outdoor heat exchanger 7 is cooled by the running therein or the outdoor air passed by the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 is reheated in the process of passing the radiator 4 (a radiation capability is lower than that during the heating), and hence the dehumidifying and cooling in the vehicle interior are performed. The controller 32 controls the number of revolution of the compressor 2 on the basis of the temperature of the heat absorber 9 which is detected by the heat absorber temperature sensor 48, also controls the valve position of the outdoor expansion valve 6 on the basis of the abovementioned high pressure of the refrigerant circuit R, and controls a refrigerant pressure (a radiator pressure PCI) of the radiator 4.

(5) Flow of Refrigerant of Cooling Mode

Next, in the cooling mode, the controller 32 opens the solenoid valve 20 in the above state of the dehumidifying and cooling mode (in this case, the outdoor expansion valve 6 may have any valve position including a fully open position (the valve position is set to an upper limit of controlling), and the air mix damper 28 has a state where the air is not passed through the radiator 4 and the heating medium-air heat exchanger 40. In consequence, the high-temperature high-pressure gas refrigerant discharged from the compressor 2 flows into the radiator 4. The air in the air flow passage 3 is not passed through the radiator 4, the air therefore only passes here, and the refrigerant flowing out from the radiator 4 flows through the refrigerant pipe 13E to reach the solenoid valve 20 and the outdoor expansion valve 6.

At this time, the solenoid valve 20 is opened and hence the refrigerant bypasses the outdoor expansion valve 6 to pass the bypass pipe 13J, and flows into the outdoor heat exchanger 7 as it is, in which the refrigerant is cooled by the running therein or the outdoor air passed through the outdoor blower 15, to condensate and liquefy. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, so that the air is cooled.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 does not pass the radiator 4 but is blown out from the outlet 29 into the vehicle interior, and hence cooling in the vehicle interior is performed. In this cooling mode, the controller 32 controls the number of revolution of the compressor 2 on the basis of the temperature of the heat absorber 9 which is detected by the heat absorber temperature sensor 48.

(6) Heating Mode and Auxiliary Heating by Heating Medium Circulating Circuit (Auxiliary Heating Means) in the Heating Mode Next, there will be described control of the compressor 2 and the outdoor expansion valve 6 in the heating mode and auxiliary heating by the heating medium circulating circuit 23 in the heating mode.

(6-1) Control of Compressor and Outdoor Expansion Valve

The controller 32 calculates a target outlet temperature TAO from the following equation (I). The target outlet temperature TAO is a target value of a temperature of air blown out from the outlet 29 into the vehicle interior.

$$TAO = (Tset - Tin) \times K + Tbal(f(Tset, SUN, Tam)) \quad (I),$$

in which Tset is a predetermined temperature in the vehicle interior which is set by the air conditioning operating portion 53, Tin is a temperature of the air in the vehicle interior which is detected by the indoor air temperature sensor 37, K is a coefficient, and Tbal is a balance value calculated from the predetermined temperature Tset, a solar radiation amount SUN detected by the solar radiation sensor 51, and an outdoor air temperature Tam detected by the outdoor air temperature sensor 33. Further, in general, the lower the outdoor air temperature Tam is, the higher the target outlet temperature TAO becomes, and the higher the outdoor air temperature Tam is, the lower the target outlet temperature TAO becomes.

The controller 32 calculates a radiator target temperature TCO from the target outlet temperature TAO, and next calculates a radiator target pressure PCO on the basis of the radiator target temperature TCO. Further, on the basis of the radiator target pressure PCO and a refrigerant pressure (a radiator pressure) Pci of the radiator 4 which is detected by the radiator pressure sensor 47, the controller 32 calculates a number of revolution Nc of the compressor 2, and operates the compressor 2 in the number of revolution Nc. That is, the controller 32 controls the refrigerant pressure Pci of the radiator 4 in accordance with the number of revolution Nc of the compressor 2.

In addition, the controller 32 calculates a target radiator subcool degree TGSC of the radiator 4 on the basis of the target outlet temperature TAO. On the other hand, the controller 32 calculates a subcool degree (a radiator subcool degree SC) of the refrigerant in the radiator 4 on the basis of the radiator pressure Pci and the temperature (a radiator temperature Tci) of the radiator 4 which is detected by the radiator temperature sensor 46. Further, on the basis of the radiator subcool degree SC and the target radiator subcool degree TGSC, the controller calculates a target valve position of the outdoor expansion valve 6 (a target outdoor expansion valve position TGECCV). Further, the controller 32 controls the valve position of the outdoor expansion valve 6 in accordance with the target outdoor expansion valve position TGECVV.

The controller 32 performs the calculation in such a direction as to increase the target radiator subcool degree TGSC as the target outlet temperature TAO is higher, but the present invention is not limited to this example, and the controller may perform the calculation on the basis of a difference (a capability difference) between an after-mentioned required heating capability Qtgt and a heating capability Qhp (QhpNI), or the radiator pressure Pci, or a difference (a pressure difference) between the radiator target pressure PCO and the radiator pressure Pci. In this case, the controller 32 decreases the target radiator subcool degree TGSC, when the capability difference is smaller, the pressure difference is smaller, an air volume of the indoor blower 27 is smaller, or the radiator pressure Pci is smaller.

(6-2) Control 1 of Heating Medium Circulating Circuit

In addition, when the controller 32 judges that the heating capability by the radiator 4 runs short in this heating mode, the controller energizes the heating medium heating electric heater 35 to generate heat, and operates the circulating pump 30, thereby executing the heating by the heating medium circulating circuit 23.

Figure 2:
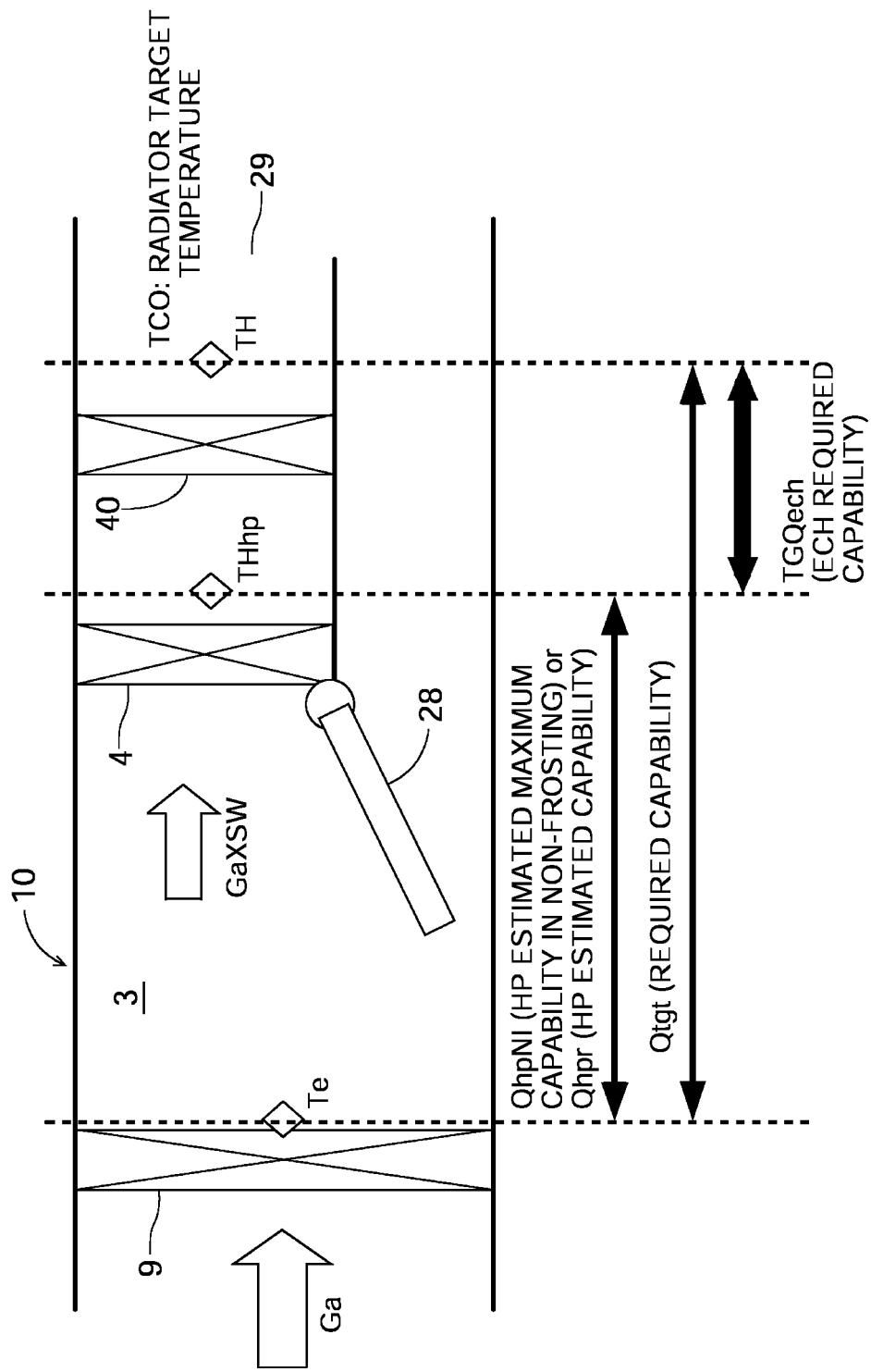
FIG. 2 is an enlarged view of an air flow passage portion of FIG. 1.

When the circulating pump 30 of the heating medium circulating circuit 23 is operated and the heating medium heating electric heater 35 is energized, the heating medium (the heating medium of a high temperature) heated by the heating medium heating electric heater 35 as described above is circulated through the heating medium-air heat exchanger 40, and hence the air passed through the radiator 4 of the air flow passage 3 is heated. FIG. 2 shows the temperatures of the respective components in the air flow passage 3 at this time. In this drawing, Ga is a mass air volume of the air flowing into the air flow passage 3, Te is the temperature of the heat absorber 9 which is detected by the heat absorber temperature sensor 48 (the temperature of the air flowing out from the heat absorber 9), Ga×SW is a value obtained by multiplying the mass air volume Ga by an opening of the air mix damper 28, THhp is a temperature of the air passed through the radiator 4 which is detected by the radiator temperature sensor 46 (i.e., the radiator temperature Tci), and TH is a temperature of the air passed through the heating medium-air heat exchanger 40 which is detected by the heating medium-air heat exchanger temperature sensor 55, and in the heating mode, a target value of the temperature of the air flowing out from the heating medium-air heat exchanger 40 and blown out from the outlet 29 is the radiator target temperature TCO. It is to be noted that when the heating medium circulating circuit 23 does not operate, TH=THhp.

Next, the control of the heating medium circulating circuit 23 in the above heating mode will be described with reference to FIG. 4 and FIG. 5. The controller 32 calculates the required heating capability Qtgt which is the heating capability required for the radiator 4 and the heating capability in non-frosting QhpNI as the heating capability Qhp which can be generated by the radiator 4 by use of Equation (II) and Equation (III). The heating capability in non-frosting QhpNI is a predicted value of the heating capability which can be generated by the radiator 4 at the outdoor air temperature Tam at this time when the outdoor heat exchanger 7 is not frosted (in non-frosting) (i.e., an estimated maximum heating capability of the heat pump).

$$Qtgt = (TCO - Te) \times Cpa \times p \times Qair \qquad \text{(II); and}$$

$$QhpNI = f(Tam, Nc, BLV, VSP, FANVout, Te) \qquad \text{(III)},$$

in which Te is the temperature of the heat absorber 9 which is detected by the heat absorber temperature sensor 48, Cpa is specific heat [kj/kg·K] of the air flowing into the radiator 4, ρ is a density (a specific volume) [kg/m$^3$] of the air flowing into the radiator 4, Qair is a volume [/h] of the air passing the radiator 4 (estimated from a blower voltage BLV of the indoor blower 27 or the like), VSP is the velocity obtained from the velocity sensor 52, and FANVout is a voltage of the outdoor blower 15.

It is to be noted that in Equation (II), in place of or in addition to Qair, the temperature of the air flowing into the radiator 4 or the temperature of the air flowing out from the radiator 4 may be employed. In addition, the number of revolution Nc of the compressor 2 of Equation (III) is an example of an index indicating a refrigerant flow rate, the blower voltage BLV is an example of an index indicating the air volume in the air flow passage 3, and the heating capability QhpNI is calculated from a function of these indexes. Additionally, the voltage FANVout of the outdoor blower 15 is an index indicating a passing air volume of the outdoor heat exchanger 7 when the vehicle is stopped (VSP is 0). In addition, QhpNI may be calculated from these indexes and one of an outlet refrigerant pressure of the radiator 4, an outlet refrigerant temperature of the radiator 4, an inlet refrigerant pressure of the radiator 4, and an inlet refrigerant temperature of the radiator 4, respectively, or any combination of them.

Figure 4:
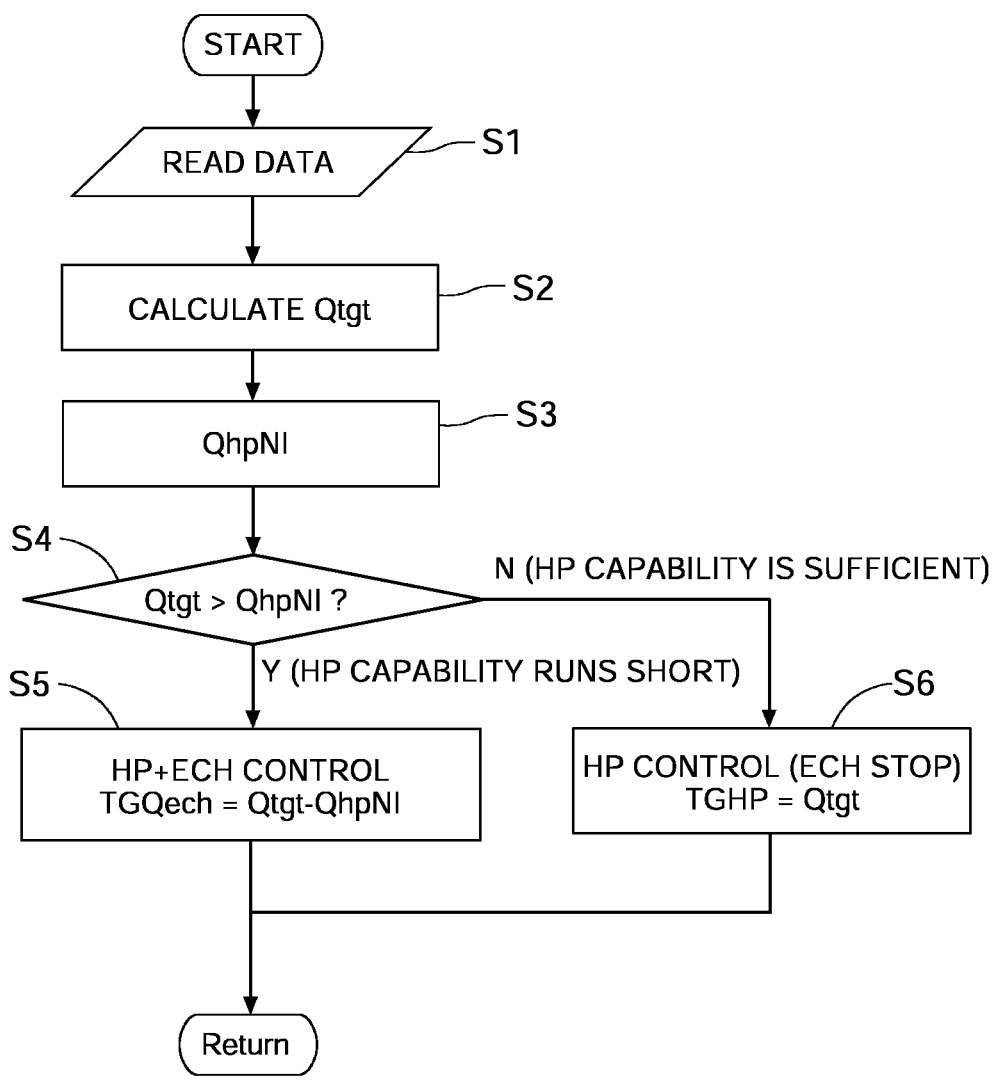
FIG. 4 is a flowchart to explain an operation of the controller of the vehicle air conditioning device of FIG. 1.

The controller 32 reads data from each sensor in step S1 of a flowchart of FIG. 4, and calculates the required heating capability Qtgt by use of Equation (II) described above in step S2. Next, the controller calculates the heating capability QhpNI (an estimated value) when the outdoor heat exchanger 7 is not frosted, by use of Equation (III) described above in step S3, and judges in step S4 whether or not the required heating capability Qtgt is larger than the heating capability QhpNI.

Figure 5:
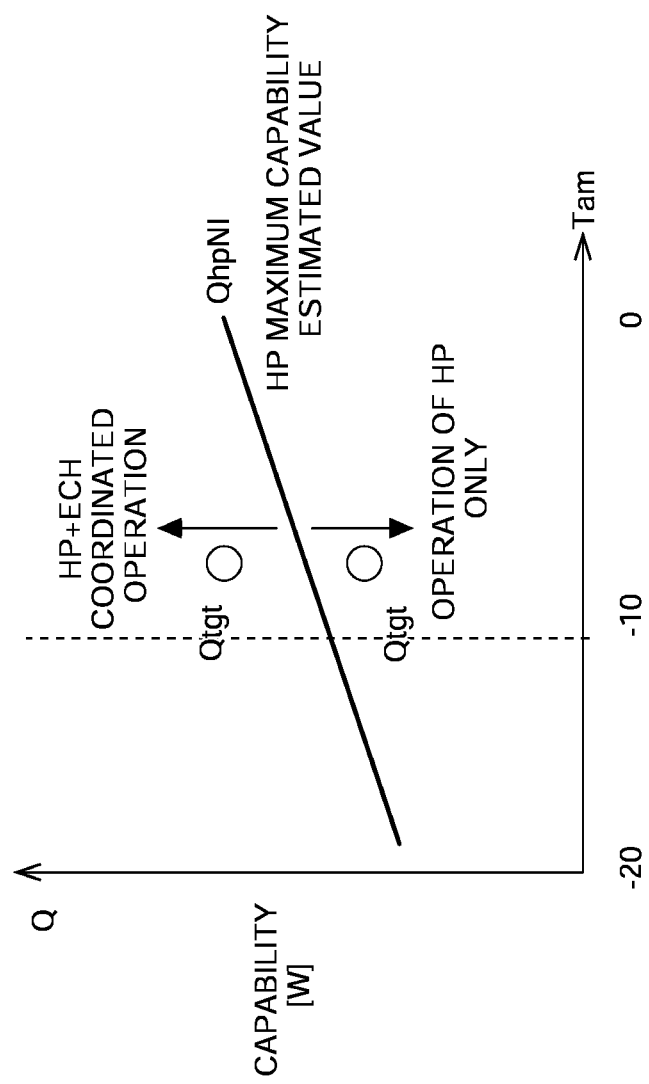
FIG. 5 is a diagram showing an example of judgment of whether or not heating is to be executed by a heating medium circulating circuit of FIG. 4.

A slanting line of FIG. 5 shows a limit line of the heating capability in non-frosting QhpNI by the radiator 4 when the outdoor heat exchanger 7 is not frosted, the abscissa indicates the outdoor air temperature Tam, and the ordinate indicates the heating capability. When the required heating capability Qtgt is (the limit line of) the heating capability in non-frosting QhpNI of FIG. 5 or less, i.e., when the heating capability in non-frosting QhpNI of the radiator 4 is sufficient to the required heating capability Qtgt, the controller advances to step S6, stops the heating by the heating medium circulating circuit 23 (stops the circulating pump 30 and does not energize the heating medium heating electric heater 35 to stop the ECH), and operates the compressor 2 and the like of the refrigerant circuit R so that the radiator 4 generates the required heating capability Qtgt (TGHP=Qtgt).

On the other hand, when the required heating capability Qtgt is larger than the limit line (the slanting line) of the heating capability in non-frosting QhpNI of FIG. 5, i.e., the heating capability in non-frosting QhpNI of the radiator 4 runs short of the required heating capability Qtgt, the controller advances from the step S4 to step S5, thereby executing a coordinated operation of the radiator 4 of the refrigerant circuit R and the heating medium-air heat exchanger 40 (ECH) of the heating medium circulating circuit 23. That is, the controller 32 operates the circulating pump 30 of the heating medium circulating circuit 23, and energizes the heating medium heating electric heater 35, thereby starting the heating by the heating medium-air heat exchanger 40 in addition to the heating by the radiator 4 of the refrigerant circuit R.

At this time, the controller 32 controls the energization to the heating medium heating electric heater 35 and the operation of the circulating pump 30 so that a required heating capability TGQech by the heating medium circulating circuit 23=the required heating capability Qtgt−the heating capability in non-frosting QhpNI, on the basis of outputs of the heating medium heating electric heater temperature sensor 50 and the heating medium-air heat exchanger temperature sensor 55. That is, the controller 32 complements the shortage of the heating capability in non-frosting QhpNI to the required heating capability Qtgt by the heating of the heating medium-air heat exchanger 40 of the heating medium circulating circuit 23. In consequence, comfortable heating in the vehicle interior can be realized, and the frosting of the outdoor heat exchanger 7 can be inhibited.

In addition, the heating by the heating medium-air heat exchanger 40 of the heating medium circulating circuit 23 is executed in a situation where the heating capability by the radiator 4 runs short, and hence it is possible to minimize deterioration of an efficiency which is caused by the operation of the heating medium circulating circuit 23. In consequence, in an electric car as in the embodiment, it is possible to effectively inhibit the disadvantage that a cruising range decreases.

Furthermore, the controller 32 compares the required heating capability Qtgt with the heating capability in non-frosting QhpNI, and complements the shortage of the heating capability in non-frosting QhpNI to the required heating capability Qtgt by the heating of the heating medium circulating circuit 23. Therefore, the comfortable heating in the vehicle interior and the inhibition of the efficiency deterioration can effectively be performed. Furthermore, it can be grasped whether or not the heating capability Qhp of the radiator 4 runs short in a stage before the outdoor heat exchanger 7 is frosted, the heating by the heating medium circulating circuit 23 can rapidly be started, and the heating in the vehicle interior can more comfortably be realized.

(6-3) Control 2 of Heating Medium Circulating Circuit

Next, another embodiment of the control of the heating medium circulating circuit 23 by the controller 32 will be described with reference to FIG. 6 and FIG. 7. As described above, in the heating mode, the refrigerant evaporates in the outdoor heat exchanger 7, and heat is absorbed from the outdoor air. Therefore, especially in a low outdoor air temperature environment, water in the outdoor air adheres as frost to the outdoor heat exchanger 7, and grows.

When the outdoor heat exchanger 7 is frosted, the heat exchange (heat absorption) between the heat exchanger and the outdoor air is disturbed, and hence the heating capability Qhp which can actually be generated by the radiator 4, i.e., an actual heating capability Qhpr becomes lower than the heating capability in non-frosting QhpNI (HP estimated maximum capability) described above. The controller 32 calculates the actual heating capability Qhpr by use of Equation (IV).

$$Qhpr=(THhp-Te) \times Cpa \times p \times Qair \qquad (IV),$$

in which THhp is the temperature of the air passed through the radiator 4 which is detected by the radiator temperature sensor 46 described above (i.e., the radiator temperature Tci).

Figure 6:
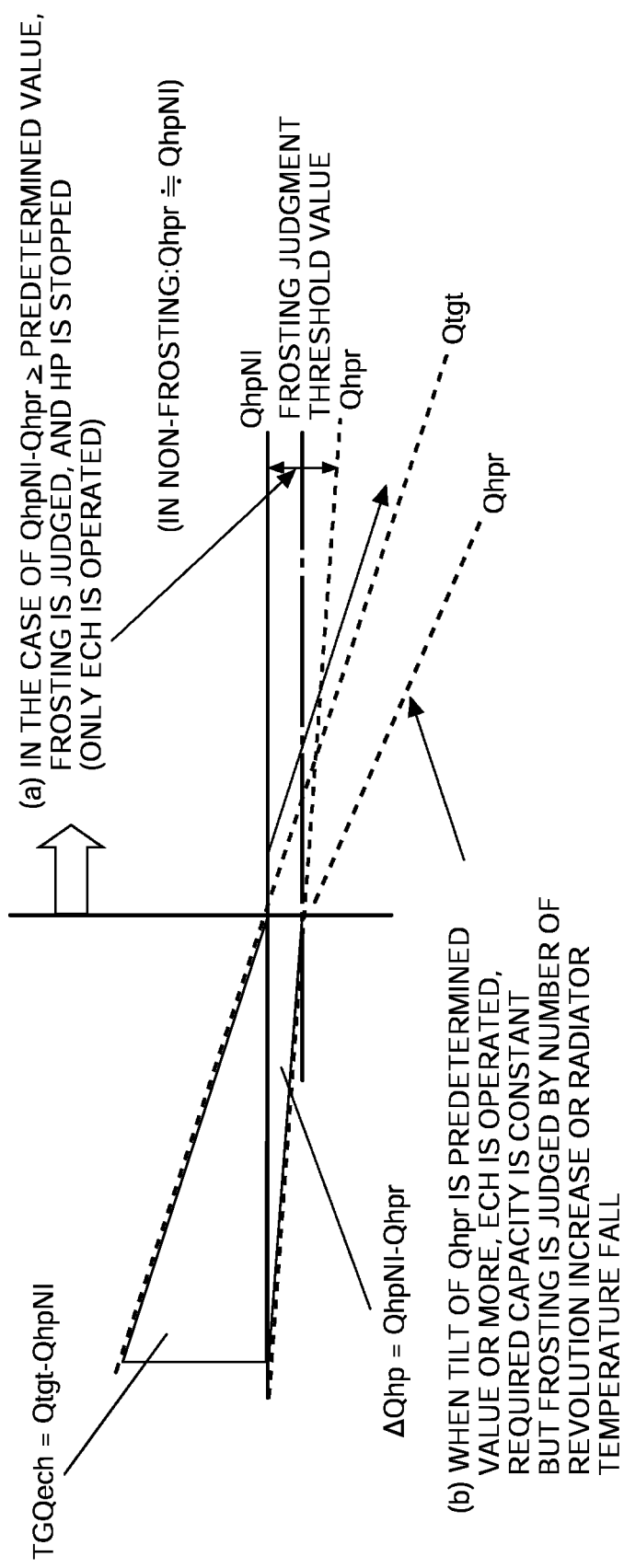
FIG. 6 is a diagram to explain another embodiment of the operation of the controller of the vehicle air conditioning device of FIG. 1.

Here, FIG. 6 shows relations among the actual heating capability Qhpr, the heating capability in non-frosting QhpNI, and the required heating capability Qtgt. When the outdoor heat exchanger 7 is not frosted, Qhpr approximately equals QhpNI, but when the outdoor heat exchanger 7 is frosted, Qhpr decreases. Therefore, the frosting onto the outdoor heat exchanger 7 can be judged by judging whether or not a difference (QhpNI−Qhpr) between the heating capability in non-frosting QhpNI and the actual heating capability Qhpr is a predetermined value (a frosting judgment threshold value) or more as shown in FIG. 6(a).

It is to be noted that it can be judged that the outdoor heat exchanger 7 is frosted by additionally judging whether or not a tilt of the decrease of the actual heating capability Qhpr is a certain value or more, whether or not the number of revolution of the compressor 2 increases, whether or not the temperature of the radiator 4 falls, or the like as shown in FIG. 6(b). However, in this embodiment, the frosting is judged by the above method of (a).

In addition, the actual heating capability Qhpr is lower than the heating capability in non-frosting QhpNI. Therefore, even when the energization to the heating medium heating electric heater 35 and the operation of the circulating pump 30 are controlled in accordance with the required heating capability TGQech by the heating medium circulating circuit 23=the required heating capability Qtgt−the heating capability in non-frosting QhpNI (a hatched portion of FIG. 6) as in the above embodiment (FIG. 4), the capability disadvantageously actually runs short as much as (QhpNI−Qhpr) shown by grid lines in FIG. 6. Thus, in this embodiment, the controller 32 corrects the shortage to control the heating medium circulating circuit 23.

Figure 7:
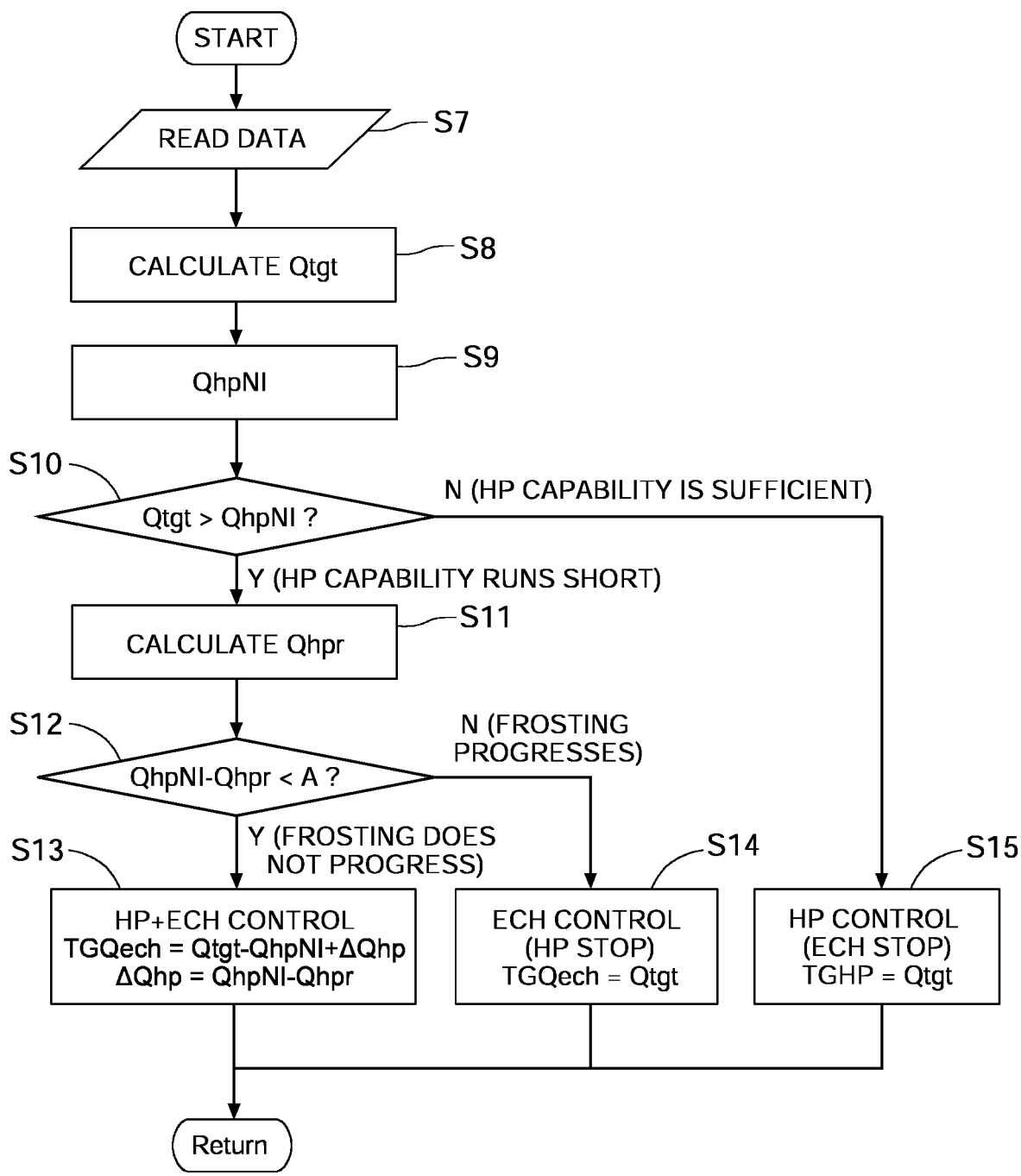
FIG. 7 is a flowchart to explain the operation of the controller of FIG. 6.

That is, the controller 32 reads data from each sensor in step S7 of a flowchart of FIG. 7, and calculates the required heating capability Qtgt by use of Equation (II) described above in step S8 in the same manner as described above. Next, the controller calculates the heating capability QhpNI (an estimated value) when the outdoor heat exchanger 7 is not frosted by use of Equation (III) described above in step S9, and similarly first judges in step S10 whether or not the required heating capability Qtgt is larger than the heating capability QhpNI.

Further, when the heating capability in non-frosting QhpNI of the radiator 4 is sufficient to the required heating capability Qtgt, the controller advances to step S15, stops the heating by the heating medium circulating circuit 23 (stops the circulating pump 30, and does not energize the heating medium heating electric heater 35 to stop ECH), and operates the compressor 2 and the like of the refrigerant circuit R so that the radiator 4 generates the required heating capability Qtgt (TGHP=Qtgt).

On the other hand, when the heating capability in non-frosting QhpNI of the radiator 4 runs short of the required heating capability Qtgt, the controller advances from step S10 to step S11, and calculates the actual heating capability Qhpr by use of Equation (IV) described above. Further, it is judged in step S12 whether or not the difference (QhpNI−Qhpr) between the heating capability in non-frosting QhpNI and the actual heating capability Qhpr is smaller than a predetermined value A. The respective heating capabilities are calculated by Equations (II) to (IV) described above, so that it is possible to more accurately control the judgment of the heating capability by the radiator 4 and the heating by the heating medium circulating circuit 23 due to the shortage of the capability. It is to be noted that the predetermined value A is a value to judge a state where the outdoor heat exchanger 7 is frosted but the growth of the frost does not progress that much, and the value may be the abovementioned frosting judgment threshold value or a different value.

Further, when the difference QhpNI−Qhpr is smaller than a predetermined value A, the controller 32 judges that the frosting of the outdoor heat exchanger 7 does not progress to advance from the step S12 to step S13, thereby executing a coordinated operation of the radiator 4 of the refrigerant circuit R and the heating medium-air heat exchanger 40 (ECH) of the heating medium circulating circuit 23. That is, the controller 32 operates the circulating pump 30 of the heating medium circulating circuit 23 and energizes the heating medium heating electric heater 35, thereby starting the heating by the heating medium-air heat exchanger 40 in addition to the heating by the radiator 4 of the refrigerant circuit R.

At this time, the controller 32 controls the energization to the heating medium heating electric heater 35 and the operation of the circulating pump 30 so that the required heating capability TGQech by the heating medium circulating circuit 23=the required heating capability Qtgt−the heating capability in non-frosting QhpNI+ΔQhp, on the basis of the output of the heating medium heating electric heater temperature sensor 50 or the heating medium-air heat exchanger temperature sensor 55. This ΔQhp is the difference between the heating capability in non-frosting QhpNI and the actual heating capability Qhpr (ΔQhp=QhpNI−Qhpr).

That is, in this embodiment, the controller 32 complements the shortage of the heating capability in non-frosting QhpNI to the required heating capability Qtgt by the heating of the heating medium-air heat exchanger 40 of the heating medium circulating circuit 23, and adds the difference ΔQhp between the heating capability in non-frosting QhpNI and the actual heating capability Qhpr to perform the heating by the heating medium-air heat exchanger 40 of the heating medium circulating circuit 23, when the actual heating capability Qhpr to be actually generated in the radiator 4 is smaller than the heating capability in non-frosting QhpNI. In consequence, when the outdoor heat exchanger 7 is frosted and the actual heating capability Qhpr to be actually generated by the radiator 4 is lower than the heating capability in non-frosting QhpNI, the lowering can be complemented by the heating medium circulating circuit 23, and comfort can further improve.

It is to be noted that when the difference QhpNI−Qhpr is the predetermined value A or more in the step S12 of FIG. 7, the controller 32 judges that the frosting of the outdoor heat exchanger 7 does not progress to advance from the step S12 to step S14, stops the compressor 2 of the refrigerant circuit R (HP stop), and operates the heating medium heating electric heater 35 and the circulating pump 30 so that the heating medium-air heat exchanger 40 generates the required heating capability Qtgt (TGQech=Qtgt).

As described above, when the degree of the progress of the frosting onto the outdoor heat exchanger 7 is grasped and the frosting disadvantageously progresses, the vehicle interior heating is changed to the heating only by the heating medium-air heat exchanger 40 of the heating medium circulating circuit 23. Therefore, it is possible to continuously perform the heating in the vehicle interior by the heating medium circulating circuit 23, while preventing further growth of the frosting of the outdoor heat exchanger 7 or promoting melting of the frosting.

(6-4) Control 3 of Heating Medium Circulating Circuit

Next, still another embodiment of the control of the heating medium circulating circuit 23 by the controller 32 will be described with reference to FIG. 8. The heating medium circulating circuit 23 as auxiliary heating means in this case circulates the heating medium heated by the heating medium heating electric heater 35 (the heating medium of the high temperature) through the heating medium-air heat exchanger 40 by the circulating pump 30 to heat the air in the air flow passage 3 which has passed through the radiator 4, and hence time is required until the heating medium (the heating medium of the high temperature) of a temperature suitable for the heating is obtained. Thus, in this embodiment, the controller 32 executes a preliminary operation of the heating medium circulating circuit 23 in a stage before the heating capability by the radiator 4 (the heating capability in non-frosting QhpNI) runs short.

Figure 8:
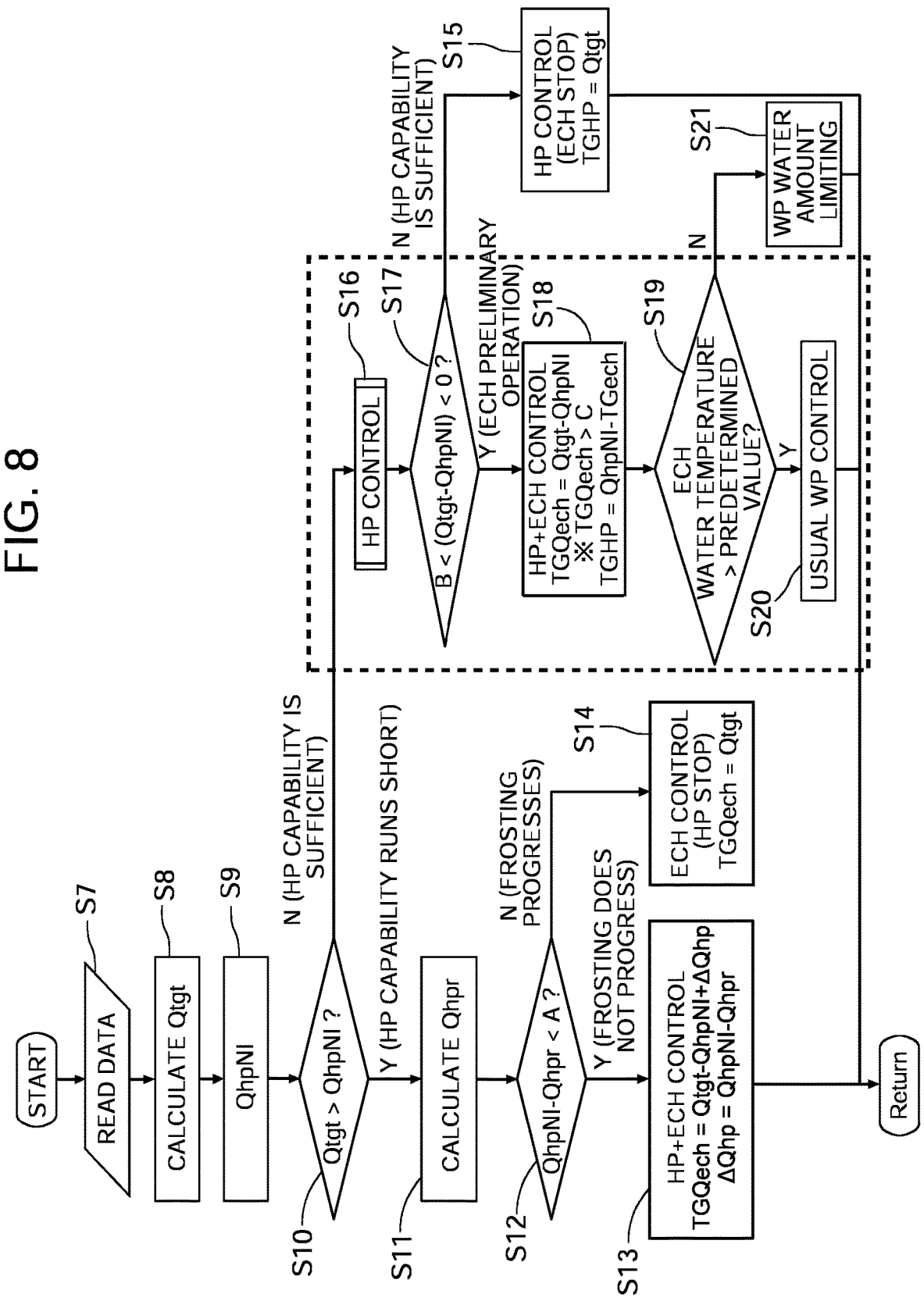
FIG. 8 is a flowchart to explain another embodiment of the operation of the controller of the vehicle air conditioning device of FIG. 1.

FIG. 8 shows the control of the controller 32 in such a case, and steps denoted with the same reference numerals are the same steps as in FIG. 7. That is, in this embodiment, a range shown by broken line X in FIG. 8 shows the preliminary operation of the heating medium circulating circuit 23 which is added to FIG. 7. Subsequently, a part different from FIG. 7 will mainly be described. In step S10, the controller 32 advances to step S16 when the heating capability in non-frosting QhpNI of the radiator 4 is sufficient to the required heating capability Qtgt, and operates the compressor 2 and the like of the refrigerant circuit R to heat the air to be supplied from the air flow passage 3 into the vehicle interior by the radiator 4 (HP control).

Next, it is judged in step S17 whether or not a difference (Qtgt−QhpNI) between the required heating capability Qtgt and the heating capability in non-frosting QhpNI is smaller than 0 and larger than a predetermined value B. The predetermined value B is a predetermined negative value whose absolute value is small. That is, in the step S17, the controller 32 judges that the heating capability in non-frosting QhpNI is the required heating capability Qtgt or more (step S10) and whether or not the difference is smaller than the absolute value of B.

Further, in the step S17, when the difference (Qtgt−QhpNI) is B or less, i.e., when the heating capability in non-frosting QhpNI is larger than the required heating capability Qtgt as much as the absolute value of B or more, the controller judges that the heating capability by the radiator 4 is sufficient to advance to step S15, stops the heating by the heating medium circulating circuit 23 in the same manner as in FIG. 7 (stops the circulating pump 30, does not energize the heating medium heating electric heater 35, and stops ECH), and operates the compressor 2 and the like of the refrigerant circuit R so that the radiator 4 generates the required heating capability Qtgt (TGHP=Qtgt).

On the other hand, when the difference (Qtgt−QhpNI) is smaller than 0 and larger than B in the step S17, i.e., when the heating capability in non-frosting QhpNI is larger than the required heating capability Qtgt but the difference is reduced and smaller than the absolute value of B, the controller judges that the preliminary operation of the heating medium circulating circuit 23 is required to advance to step S18, thereby starting the preliminary operation of the heating medium circulating circuit 23.

In this preliminary operation, the controller starts the operation of the circulating pump 30 of the heating medium circulating circuit 23 and the energization to the heating medium heating electric heater 35 while operating the compressor 2 of the refrigerant circuit R, and operates the radiator 4 of the refrigerant circuit R (HP) and the heating medium-air heat exchanger 40 (ECH) of the heating medium circulating circuit 23, but controls the energization to the heating medium heating electric heater 35 and the operation of the circulating pump 30 so that the required heating capability TGQech by the heating medium circulating circuit 23=the required heating capability Qtgt−the heating capability in non-frosting QhpNI. Additionally, the required heating capability TGQech of the heating medium circulating circuit 23 is made larger than a predetermined value C to prevent the deterioration of the efficiency of the heating medium circulating circuit 23 itself. In consequence, a temperature of the heating medium in the heating medium circulating circuit 23 rises, and hence when the shortage of the heating capability by the radiator 4 is predicted, it is possible to previously warm the heating medium in the heating medium circulating circuit 23, and it is possible to rapidly realize complementing of the heating capability by use of the heating medium circulating circuit 23.

In addition, the heating by the heating medium circulating circuit 23 increases during the preliminary operation, and hence the heating capability of the radiator 4 is decreased so that the target heating capability TGHP of the radiator 4 equals the heating capability in non-frosting QhpNI minus TGQech. That is, the compressor 2 and the like of the refrigerant circuit R are operated so that the radiator 4 generates the capability of QhpNI−TGQech, and eventually, the heating capability of the radiator 4 combined with that of the heating medium-air heat exchanger 40 becomes the required heating capability Qtgt. In consequence, it is also possible to eliminate the disadvantage that the heating capability increases more than necessary during the preliminary operation of the heating medium circulating circuit 23.

Next, in step S19, the controller 32 judges whether or not a temperature (shown by ECH water temperature in the flowchart of FIG. 8) of the heating medium passed through the heating medium heating electric heater 35 of the heating medium circulating circuit 23, which is detected by the heating medium heating electric heater temperature sensor 50, is higher than a predetermined value (a temperature for the heating). When the temperature is higher, the controller advances to step S20 to set an amount of the heating medium to be circulated by the circulating pump (shown by WP in the flowchart of FIG. 8) 30 to a usual heating medium amount, and when the temperature is a predetermined value or less, the controller advances to step S21 to limit and decrease the amount of the heating medium to be circulated to the heating medium-air heat exchanger 40 by the circulating pump 30 (shown by WP water amount limiting in the flowchart of FIG. 8). This control of the amount of the heating medium to be circulated is executed by controlling the number of revolution of the circulating pump 30.

Thus, the controller 32 limits the amount of the heating medium to be circulated to the heating medium-air heat exchanger 40, when the temperature of the heating medium flowing through the heating medium circulating circuit 23 is lower than a predetermined value during the execution of the preliminary operation. Therefore, while inhibiting the circulation to the heating medium-air heat exchanger 40 in a state where the temperature of the heating medium in the heating medium circulating circuit 23 is still low and preventing a temperature fall of the air to be supplied into the vehicle interior, a temperature rise of the heating medium is promoted, and when the heating capability by the radiator 4 runs short, the air in the air flow passage 3 can rapidly be heated by the heating medium-air heat exchanger 40 so that the heating can be performed. It is to be noted that, in the embodiment, the amount of the heating medium to be circulated to the heating medium-air heat exchanger 40 is limited by the control of the number of revolution of the circulating pump 30, but the present invention is not limited to this embodiment. A route which bypasses the heating medium-air heat exchanger 40 may separately be disposed, and all or a part of the heating medium may be allowed to flow through this bypass route while the temperature of the heating medium is low, to limit the amount of the heating medium to be circulated to the heating medium-air heat exchanger 40.

(7) Constitutional Example 1

Figure 9:
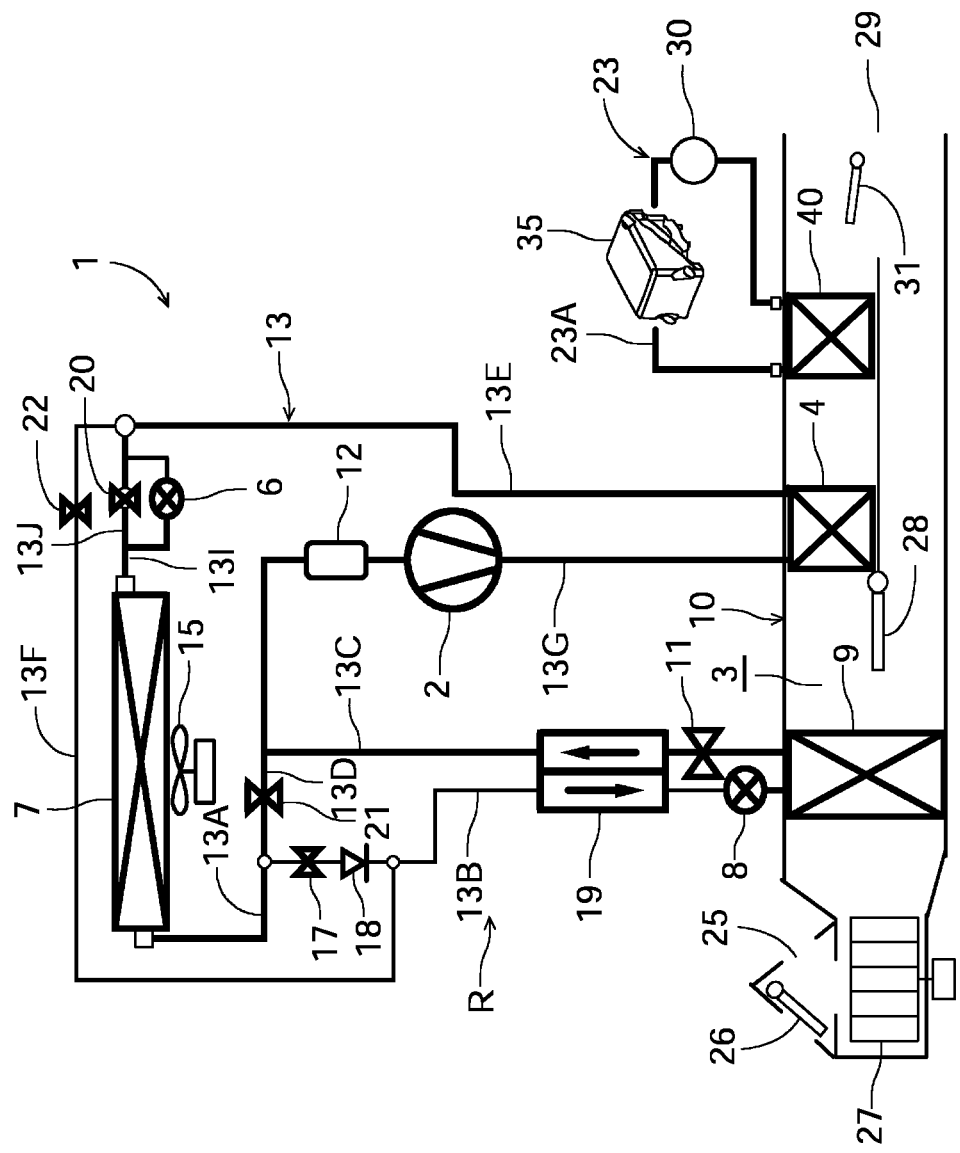
FIG. 9 is a constitutional view of a vehicle air conditioning device of another embodiment to which the present invention is applied.

Next, FIG. 9 shows a constitutional view of another embodiment of the vehicle air conditioning device 1 of the present invention. In this embodiment, in an outdoor heat exchanger 7, a receiver drier portion 14 and a subcooling portion 16 are not disposed, and a refrigerant pipe 13A extended out from the outdoor heat exchanger 7 is connected to a refrigerant pipe 13B via a solenoid valve 17 and a check valve 18. In addition, a refrigerant pipe 13D branched from the refrigerant pipe 13A is similarly connected to a refrigerant pipe 13C on a downstream side of an internal heat exchanger 19 via a solenoid valve 21.

The other constitution is similar to the example of FIG. 1. The present invention is also effective in the vehicle air conditioning device 1 of a refrigerant circuit R in which the outdoor heat exchanger 7 which does not have the receiver drier portion 14 and the subcooling portion 16 is employed in this manner.

(8) Constitutional Example 2

Figure 10:
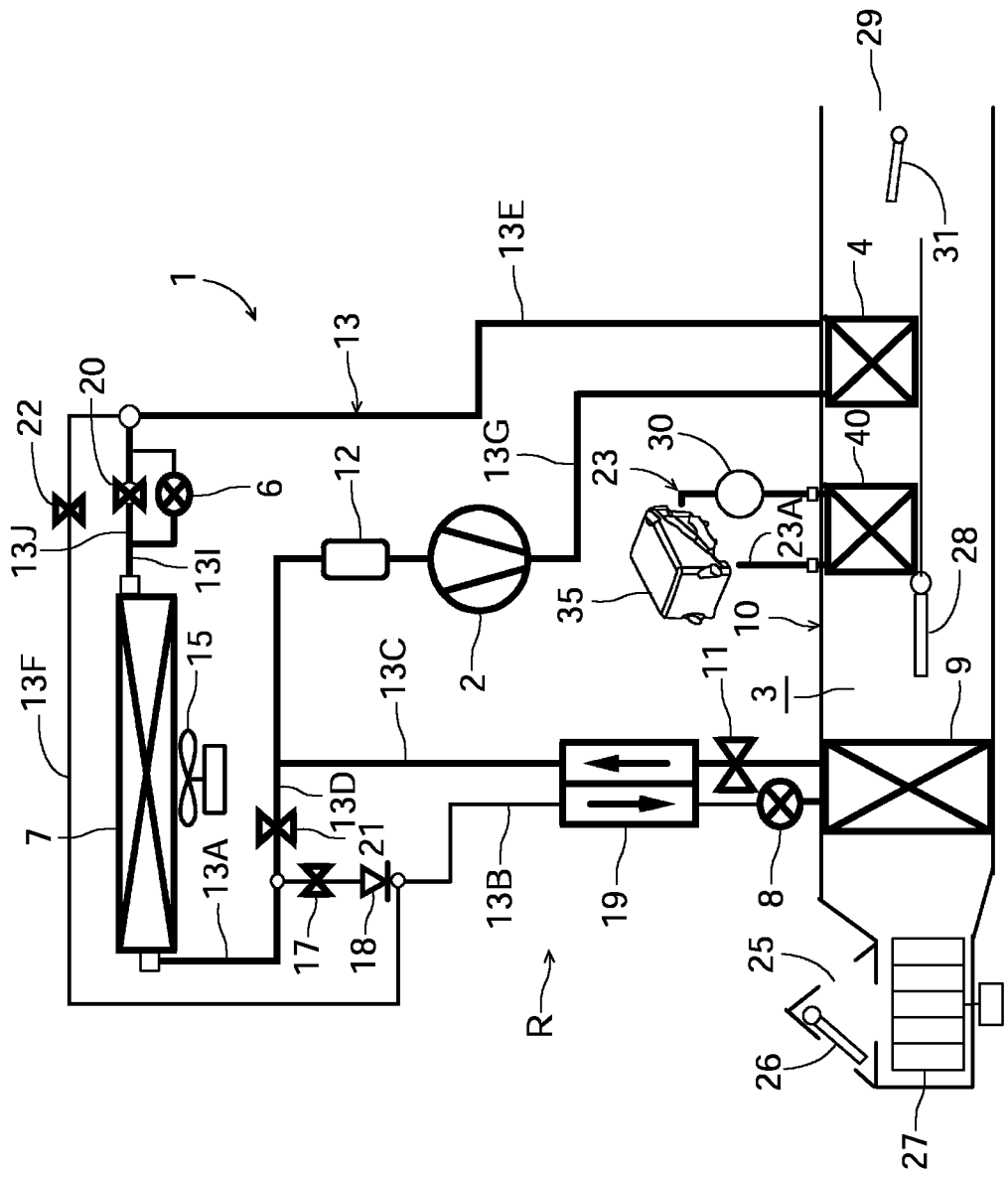
FIG. 10 is a constitutional view of a vehicle air conditioning device of still another embodiment to which the present invention is applied.
Figure 11:
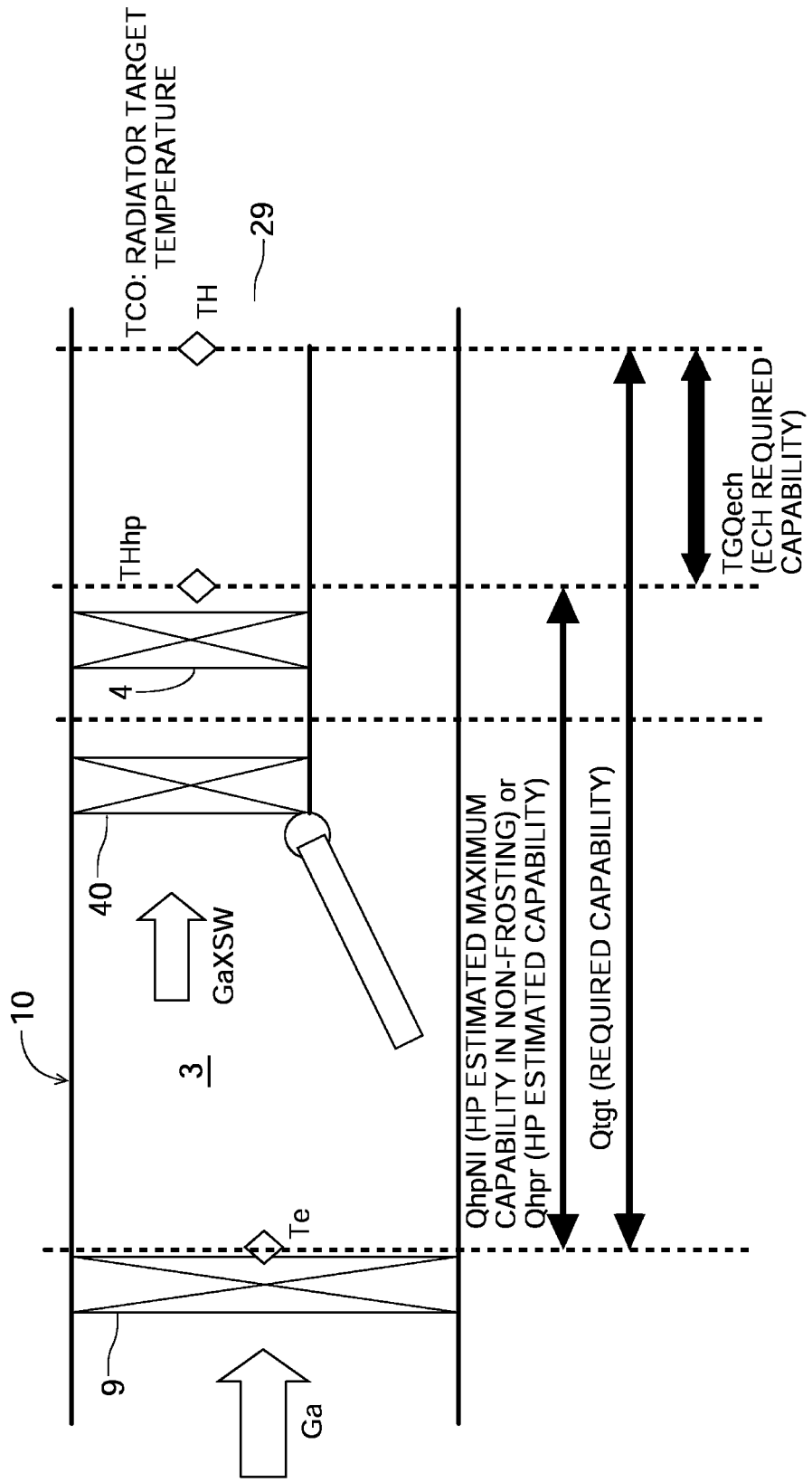
FIG. 11 is an enlarged view of an air flow passage portion of FIG. 10.
Figure 12:
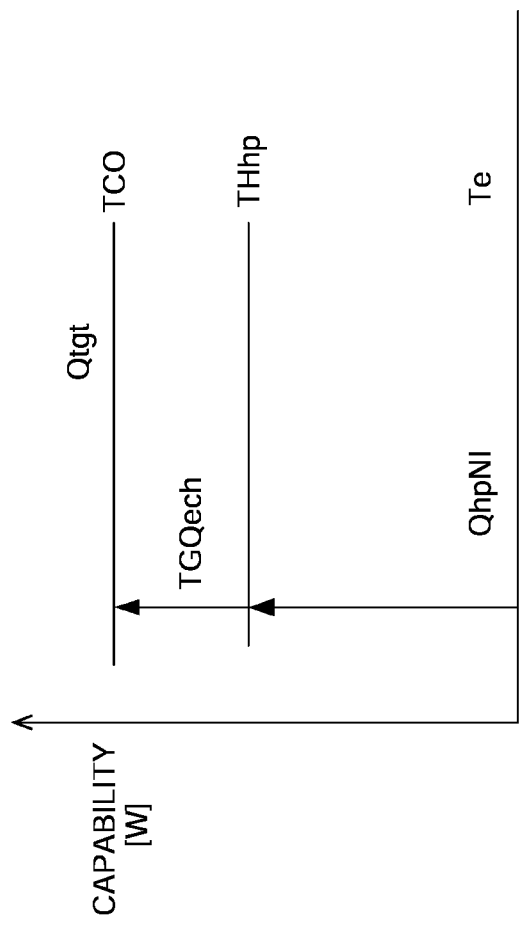
FIG. 12 is a diagram to explain relations of temperatures of respective components in FIG. 11.

Next, FIG. 10 to FIG. 12 show constitutional views of still another embodiment of the vehicle air conditioning device 1 of the present invention. It is to be noted that a refrigerant circuit R of this embodiment is similar to FIG. 9. Additionally, in this case, a heating medium-air heat exchanger 40 of a heating medium circulating circuit 23 is disposed on an upstream side of a radiator 4 to flow of air of an air flow passage 3, which is a downstream side of an air mix damper 28. The other constitution is similar to FIG. 9.

FIG. 11 shows temperatures and the like of respective components in the air flow passage 3 at this time. In addition, FIG. 12 shows relations among a heating capability in non-frosting QhpNI, a required heating capability TGQech of the heating medium circulating circuit 23, a required heating capability Qtgt, a heat absorber temperature Te, a temperature THhp of the air flowing out from the radiator 4, and a radiator target temperature TCO. It is to be noted that, in this drawing, the same components are denoted with the same reference numerals as in FIG. 2.

In this case, the heating medium-air heat exchanger 40 is positioned on the upstream side of the radiator 4 in the air flow passage 3, and hence during an operation of the heating medium circulating circuit 23, the air is heated by the heating medium-air heat exchanger 40, and then flows into the radiator 4. The present invention is also effective in the vehicle air conditioning device 1 in which the heating medium-air heat exchanger 40 is disposed on the upstream side of the radiator 4 in this manner, and especially in this case, any problems do not occur due to a low temperature of a heating medium in the heating medium circulating circuit 23. In consequence, coordinated heating with the radiator 4 is facilitated, and such a preliminary operation as described above with reference to FIG. 8 is not required, but the air passed through the heating medium-air heat exchanger 40 disadvantageously flows into the radiator 4, and hence a temperature difference between the air and the radiator 4 becomes smaller, which causes the danger that a heat exchange efficiency deteriorates. On the other hand, when the heating medium-air heat exchanger 40 is disposed on the downstream side of the radiator 4 to the flow of the air of the air flow passage 3 as shown in FIG. 1 and FIG. 9, the air heated by the heating medium-air heat exchanger 40 does not flow into the radiator 4, and the temperature difference between the temperature of the radiator 4 and that of the air can be acquired to prevent deterioration of a heat exchange performance in the radiator 4, as compared with the case that the heating medium-air heat exchanger 40 is disposed on the upstream side of the radiator 4 as shown in FIG. 10.

(9) Constitutional Example 3

Figure 13:
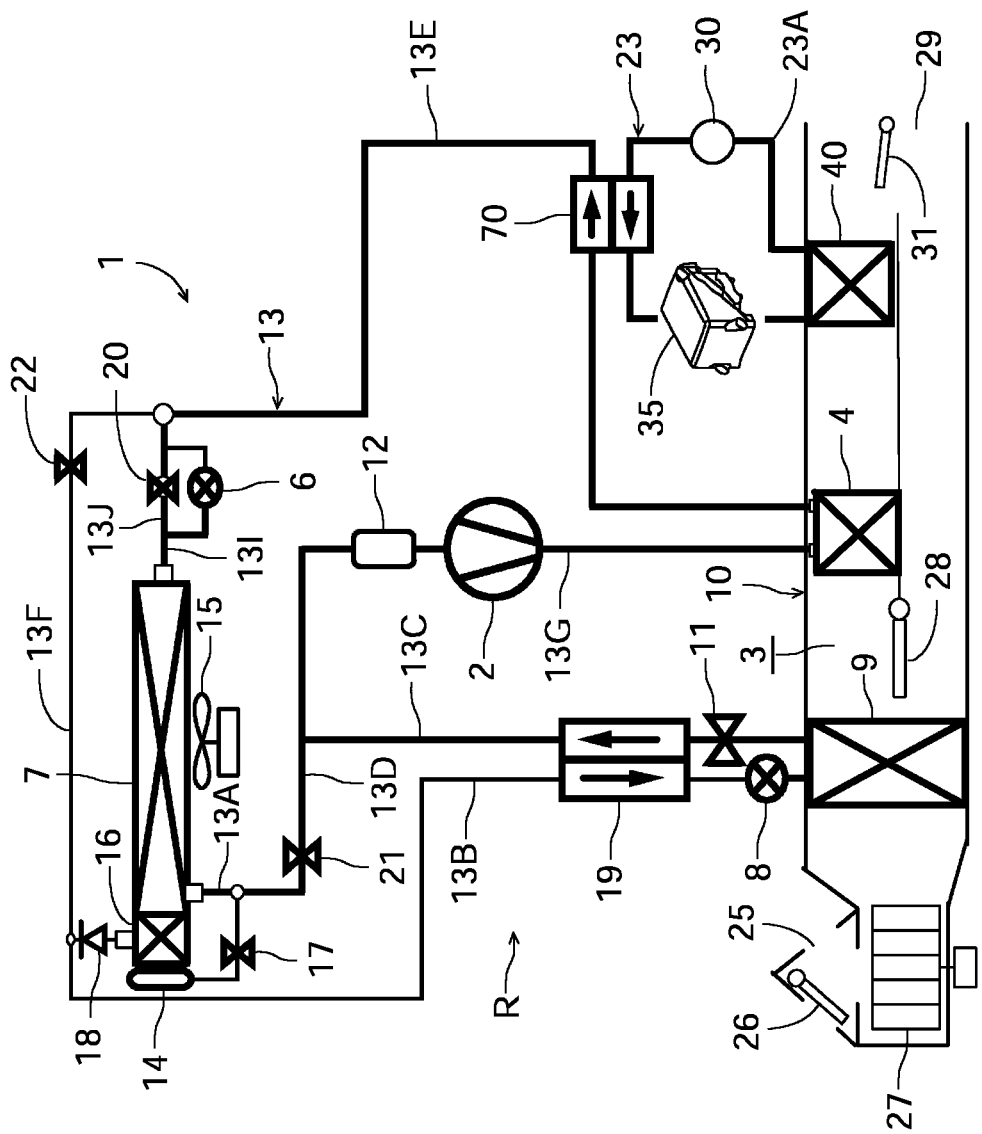
FIG. 13 is a constitutional view of a vehicle air conditioning device of a further embodiment to which the present invention is applied.

Next, FIG. 13 shows a constitutional view of a further embodiment of the vehicle air conditioning device 1 of the present invention. Basic constitutions of a refrigerant circuit R and a heating medium circulating circuit 23 of this embodiment are similar to those of FIG. 1, but in the heating medium circulating circuit 23, a heating medium-refrigerant heat exchanger 70 is disposed. The heating medium-refrigerant heat exchanger 70 performs heat exchange between a heating medium pipe 23A extended out from a circulating pump 30 and a refrigerant pipe 13E extended out from a radiator 4 of the refrigerant circuit R, and in the heating medium-refrigerant heat exchanger 70, a heating medium discharged from the circulating pump 30 is subjected to a heating operation from a refrigerant flowing out from the radiator 4. In consequence, heat can be collected from the refrigerant passed through the radiator 4 by the heating medium circulating through the heating medium circulating circuit 23.

Thus, in the heating medium circulating circuit 23, there is disposed the heating medium-refrigerant heat exchanger 70 which collects heat from the refrigerant passed through the radiator 4, and hence the heat which the refrigerant passed through the radiator 4 has is collected by the heating medium flowing in the heating medium circulating circuit 23 and conveyed to a heating medium-air heat exchanger 40, so that it is possible to more efficiently support the heating.

(10) Constitutional Example 4

Figure 14:
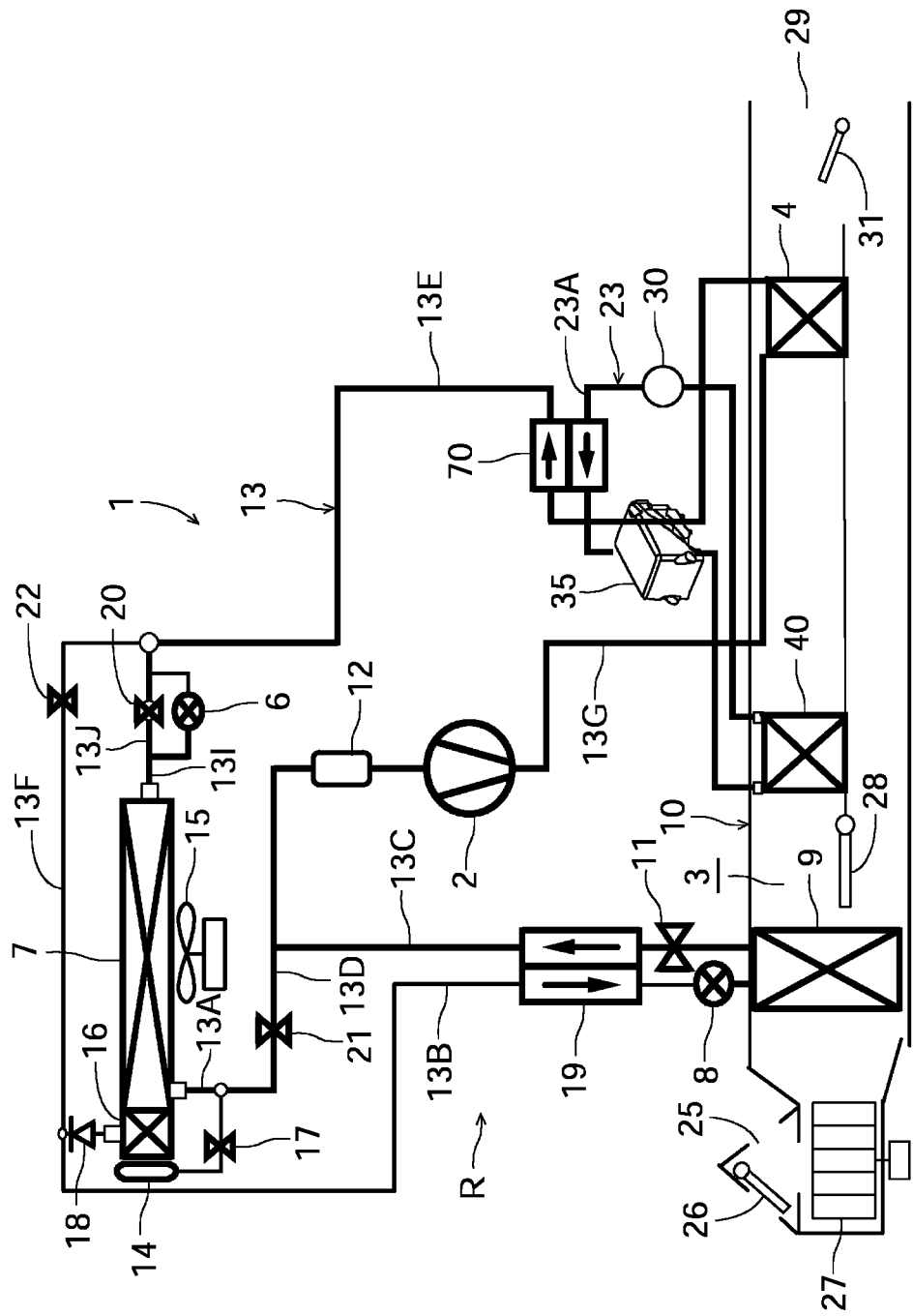
FIG. 14 is a constitutional view of a vehicle air conditioning device of a further embodiment to which the present invention is applied.

Next, FIG. 14 shows a constitutional view of a further embodiment of the vehicle air conditioning device 1 of the present invention. A refrigerant circuit R and a heating medium circulating circuit 23 of this embodiment are similar to those of FIG. 13, but a heating medium-air heat exchanger 40 of the heating medium circulating circuit 23 is disposed on an upstream side of a radiator 4 and a downstream side of an air mix damper 28 to flow of air of an air flow passage 3. Also according to such a constitution, heat which a refrigerant discharged from the radiator 4 has is collected by a heating medium flowing in the heating medium circulating circuit 23 in a heating medium-refrigerant heat exchanger 70, and conveyed to the heating medium-air heat exchanger 40, so that it is possible to more efficiently support the heating.

(11) Constitutional Example 5

Figure 15:
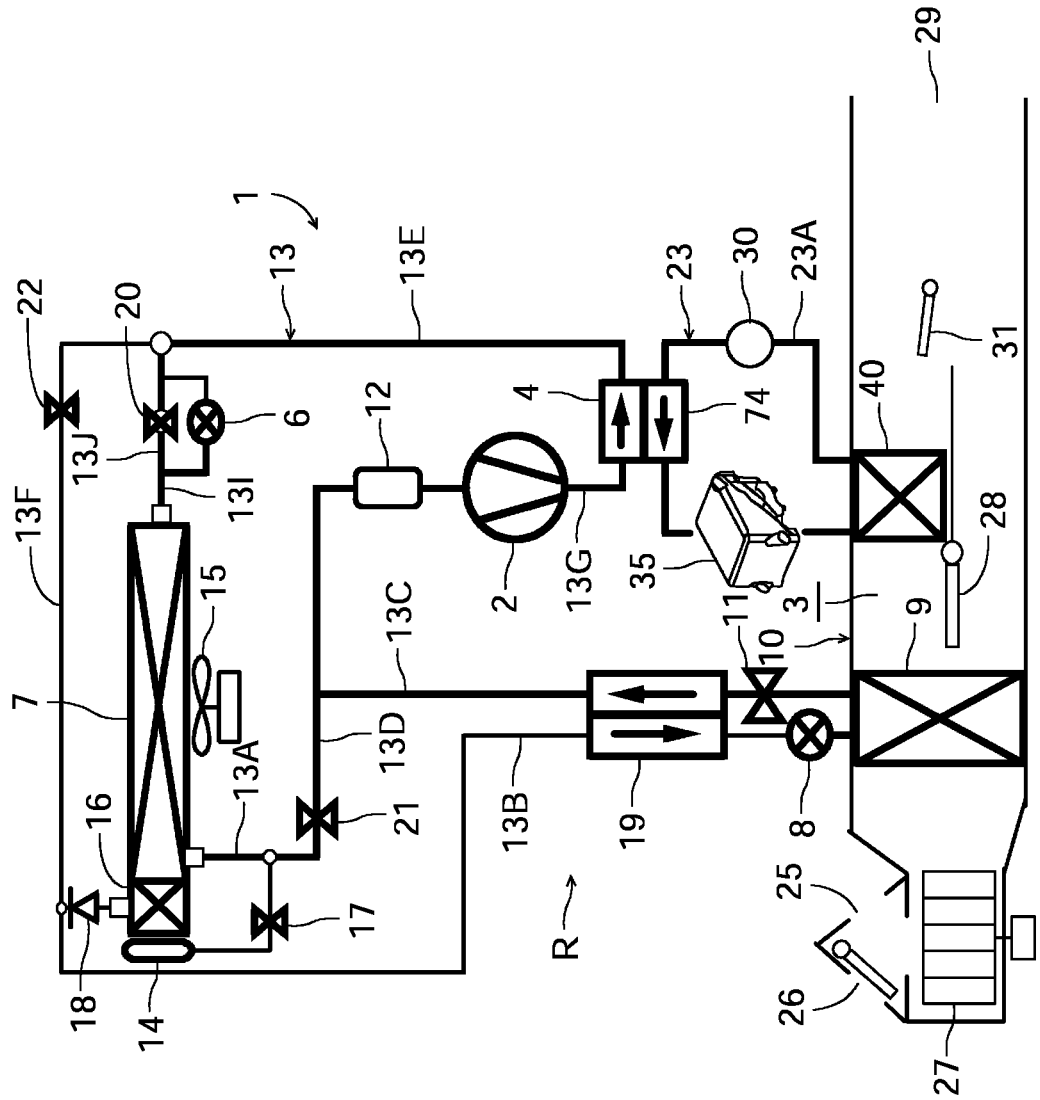
FIG. 15 is a constitutional view of a vehicle air conditioning device of a further embodiment to which the present invention is applied.

Next, FIG. 15 shows a constitutional view of a further embodiment of the vehicle air conditioning device 1 of the present invention. Pipe constitutions of a refrigerant circuit R and a heating medium circulating circuit 23 of this embodiment are basically similar to those of FIG. 1, but a radiator 4 is not disposed in an air flow passage 3, and is disposed outside the air flow passage. Instead, a heating medium-refrigerant heat exchanger 74 in this case is disposed in a heat exchange relation in the radiator 4.

The heating medium-refrigerant heat exchanger 74 is connected to a heating medium pipe 23A between a circulating pump 30 of the heating medium circulating circuit 23 and a heating medium heating electric heater 35, and the heating medium-air heat exchanger 40 of the heating medium circulating circuit 23 is disposed in the air flow passage 3. According to such a constitution, there is performed heat exchange between a heating medium discharged from the circulating pump 30 and a refrigerant flowing through the radiator 4, and the heating medium is heated by the refrigerant, next heated by the heating medium heating electric heater 35 (in a case where the heater is energized to generate heat), and then radiates heat in a heating medium-air heat exchanger 40, thereby heating air to be supplied from the air flow passage 3 into a vehicle interior.

Also in the vehicle air conditioning device 1 of such a constitution, when a heating capability by the radiator 4 runs short, the heating medium heating electric heater 35 is energized to heat the heating medium flowing in the heating medium circuit 23A, so that it is possible to support the heating and realize electrically safer heating in the vehicle interior, as compared with a case where the electric heater is disposed in the air flow passage 3 as described later.

(12) Constitutional Example 6

Figure 16:
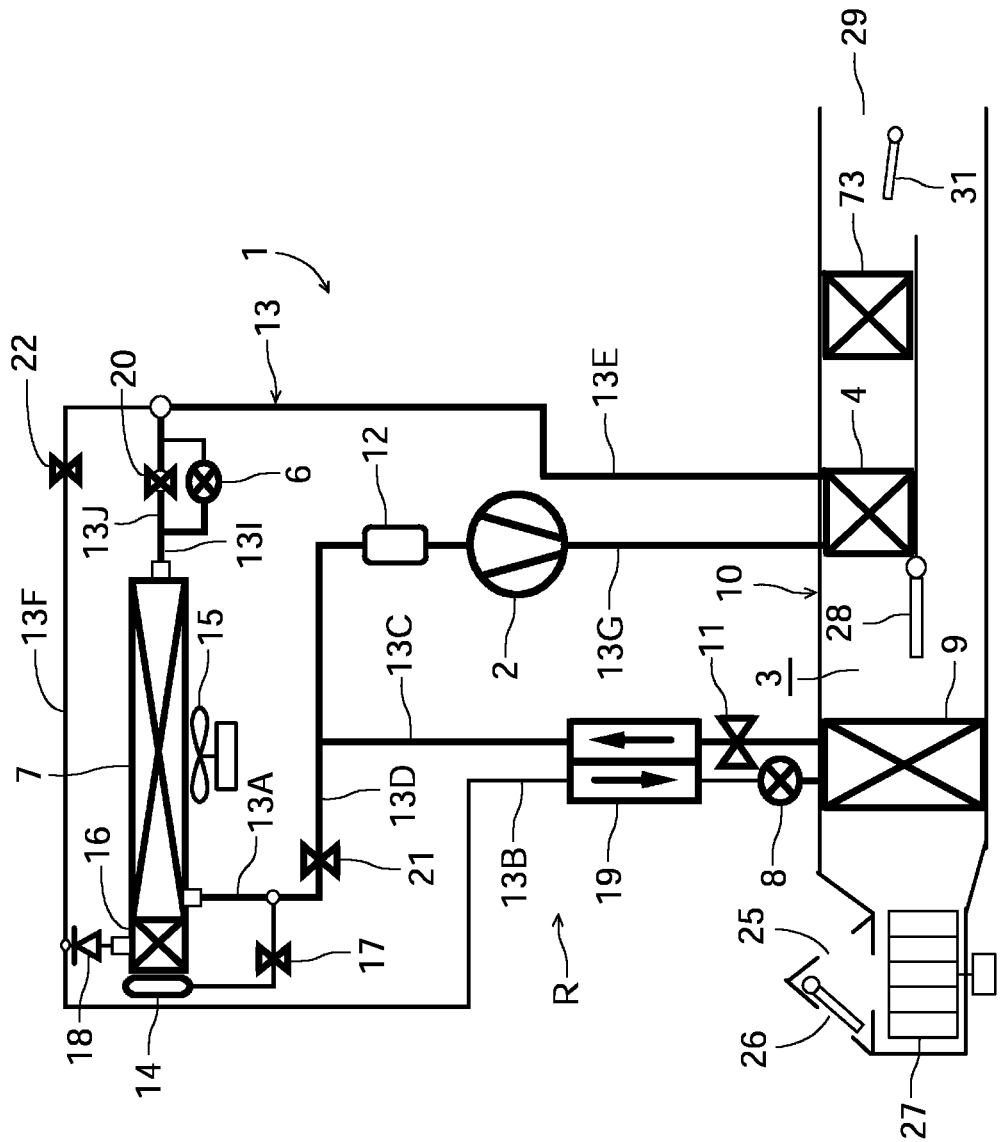
FIG. 16 is a constitutional view of a vehicle air conditioning device of a further embodiment to which the present invention is applied.
Figure 17:
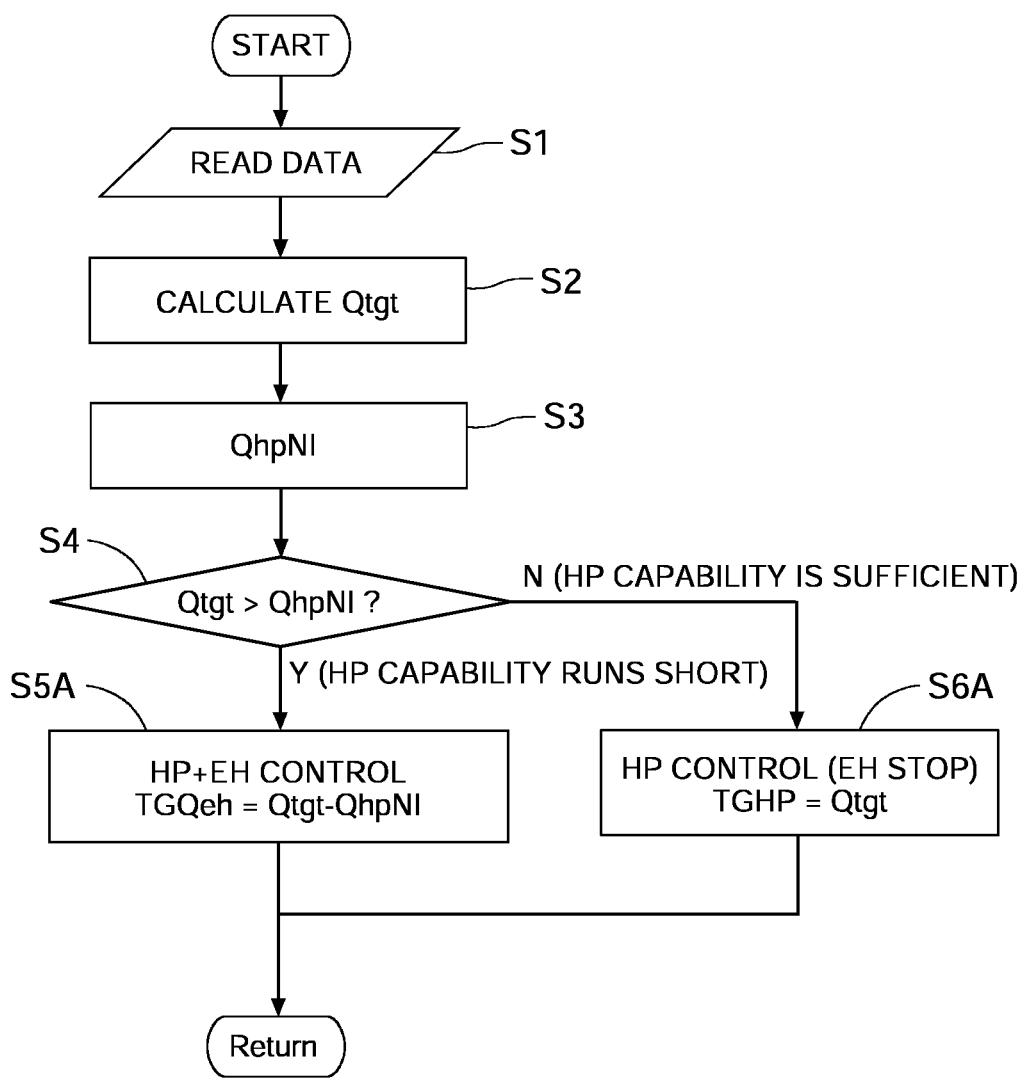
FIG. 17 is a flowchart to explain an operation of a controller of a vehicle air conditioning device of FIG. 16.
Figure 18:
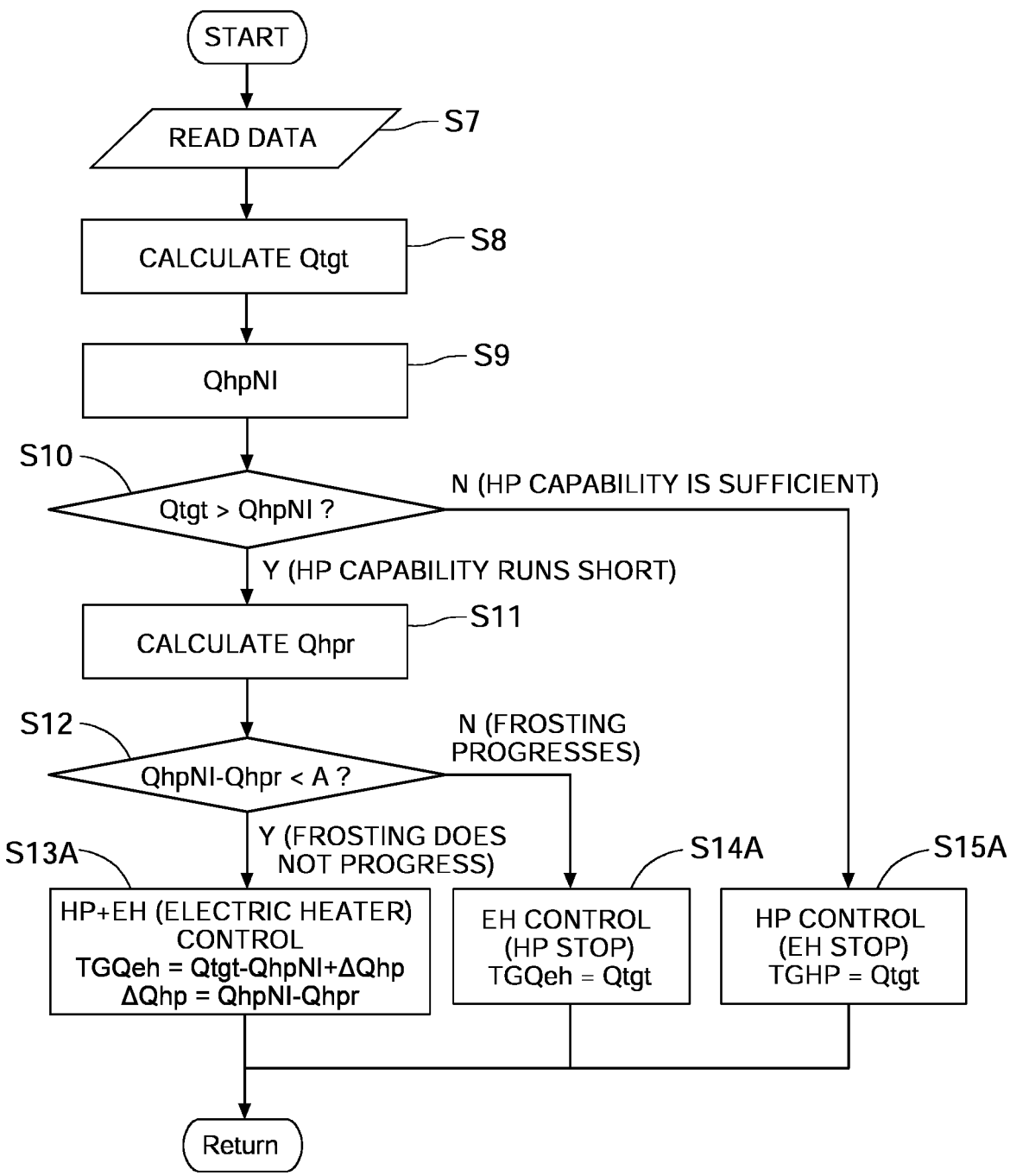
FIG. 18 is a flowchart to explain a further embodiment of the operation of the controller of the vehicle air conditioning device of FIG. 16.
Figure 19:
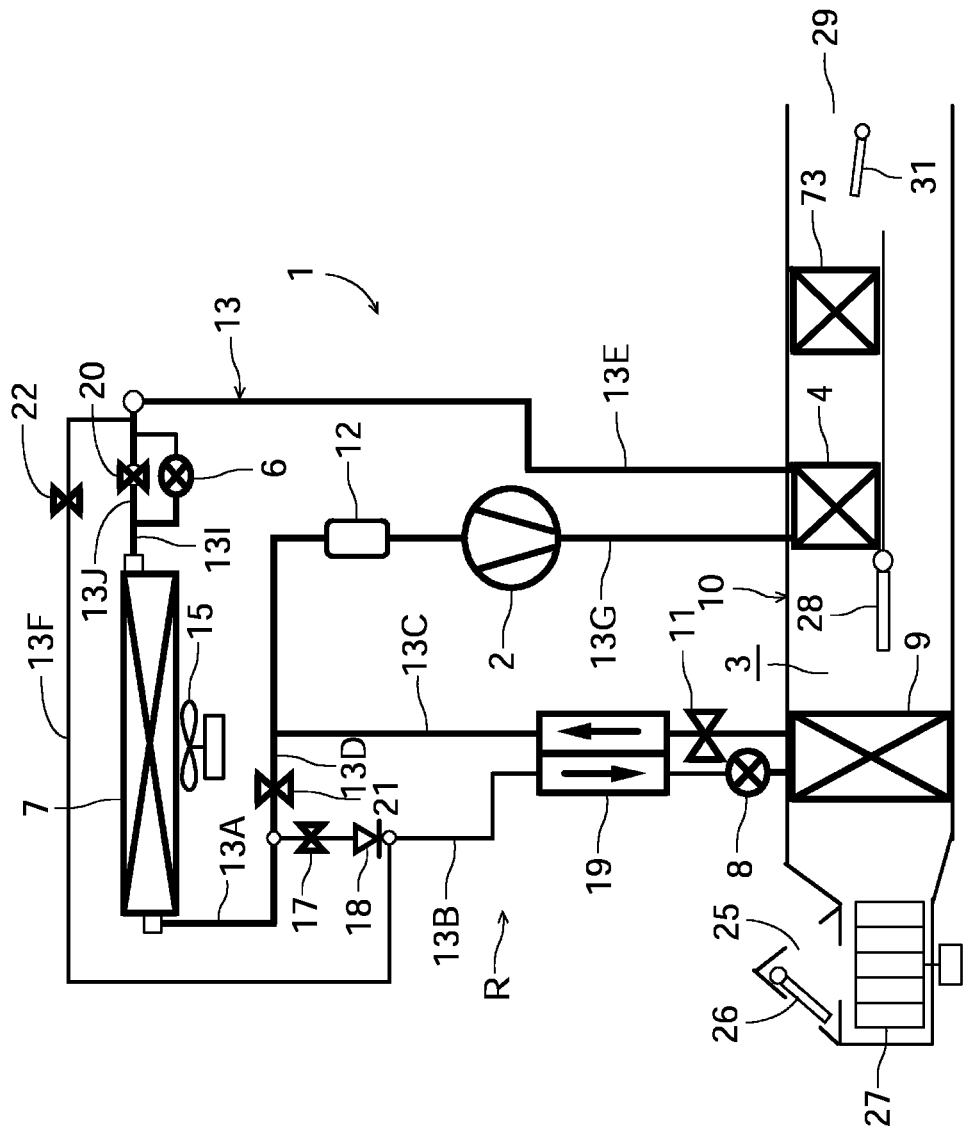
FIG. 19 is a constitutional view of a vehicle air conditioning device of a still further embodiment to which the present invention is applied.

It is to be noted that, in the above respective embodiments, a heating medium circulating circuit 23 is employed as auxiliary heating means, but the auxiliary heating means may be constituted of a usual electric heater (e.g., a PTC heater) 73. FIG. 16 shows a constitutional example corresponding to FIG. 1 in this case, FIG. 17 shows an example of a control flowchart corresponding to FIG. 4, FIG. 18 shows an example of a control flowchart corresponding to FIG. 7, and FIG. 19 shows a constitutional example corresponding to FIG. 9. In FIG. 16 and FIG. 19, the heating medium circulating circuit 23 of FIG. 1 and FIG. 9 is replaced with the electric heater 73 in this case. In addition, the step S5 and step S6 of FIG. 4 are replaced with step S5A and step S6A of FIG. 17, and the step S13 to step S15 of FIG. 7 are replaced with step S13A to step S15A of FIG. 18, but a target TGQech is replaced with a required heating capability TGQeh by the electric heater 73.

The other constitution and control are basically similar, and a controller 32 controls energization of the electric heater 73 in place of the circulating pump 30 and the heating medium heating electric heater 35 of the heating medium circulating circuit 23, to complement a heating capability of a radiator 4 by heat generated by the electric heater in the same manner as described above, so that detailed descriptions are omitted. Thus, air to be supplied into a vehicle interior may be heated by the electric heater 73, and such a constitution is advantageously simplified as compared with the case that the heating medium circulating circuit 23 is used.

Needless to say, the electric heater 73 may be disposed on an air upstream side of a radiator 4 of FIG. 16 or FIG. 19 as in the case of FIG. 10, and in this case, there is the effect that it is possible to eliminate the disadvantage that the temperature of the air to be supplied into the vehicle interior lowers in an initial stage of start of energization to the electric heater 73.

It is to be noted that in the embodiments, the present invention is applied to the vehicle air conditioning device 1 which changes and executes respective operation modes such as a heating mode, a dehumidifying and heating mode, a dehumidifying and cooling mode and a cooling mode, but the present invention is not limited to these embodiments, and is also effective for a vehicle air conditioning device which only performs the heating mode.

In addition, the constitution of the refrigerant circuit R and the respective numeric values described in each of the above embodiments are not limited, and are, needless to say, changeable without departing from the gist of the present invention.

DESCRIPTION OF REFERENCE NUMERALS 1 vehicle air conditioning device
2 compressor
3 air flow passage
4 radiator
6 outdoor expansion valve
7 outdoor heat exchanger
8 indoor expansion valve
9 heat absorber
11 evaporation capability control valve
17, 20, 21 and 22 solenoid valve
23 heating medium circulating circuit (auxiliary heating means)
26 suction changing damper
27 indoor blower (blower fan)
28 air mix damper
30 circulating pump (circulating means)
32 controller (control means)
35 heating medium heating electric heater (electric heater)
40 heating medium-air heat exchanger
70 and 74 heating medium-refrigerant heat exchanger
73 electric heater
R refrigerant circuit

The invention claimed is:
1. A vehicle air conditioning device comprising:
a compressor which compresses a refrigerant;
an air flow passage through which air to be supplied into a vehicle interior flows;
a radiator which lets the refrigerant radiate heat to heat the air to be supplied from the air flow passage into the vehicle interior;

a heat absorber which lets the refrigerant absorb heat to cool the air to be supplied from the air flow passage into the vehicle interior;

an outdoor heat exchanger disposed outside the vehicle interior to let the refrigerant radiate or absorb heat; and a controller, the controller being configured to execute at least a heating mode in which the refrigerant discharged from the compressor radiates heat in the radiator and the refrigerant by which heat has been radiated is decompressed and then absorbs heat in the outdoor heat exchanger, the vehicle air conditioning device further comprising:

auxiliary heating means for heating the air to be supplied from the air flow passage into the vehicle interior, wherein the controller compares a required heating capability Qtgt, which is the heating capability required for the radiator, with a heating capability in non-frosting QhpNI to be generated by the radiator when the outdoor heat exchanger is not frosted, and complements a shortage of the heating capability in non-frosting QhpNI to the required heating capability Qtgt by the heating of the auxiliary heating means, wherein the heating capability in non-frosting QhpNI to be generated by the radiator when the outdoor heat exchanger is not frosted is the estimated maximum heating capability when the outdoor heat exchanger is not frosted;

wherein the controller stops the compressor and controls the auxiliary heating means in accordance with the required heating capability Qtgt, when an actual heating capability Qhpr to be actually generated by the radiator is smaller than the heating capability in non-frosting QhpNI and a difference between the heating capability in non-frosting QhpNI and the actual heating capability Qhpr is larger than a predetermined value.

2. The vehicle air conditioning device according to claim 1, wherein the controller adds a difference between the heating capability in non-frosting QhpNI and an actual heating capability Qhpr to be actually generated by the radiator to perform the heating by the auxiliary heating means, when the actual heating capability Qhpr is smaller than the heating capability in non-frosting QhpNI.

3. The vehicle air conditioning device according to claim 2, wherein the controller stops the compressor and controls the auxiliary heating means in accordance with the required heating capability Qtgt, when an actual heating capability Qhpr to be actually generated by the radiator is smaller than the heating capability in non-frosting QhpNI and a difference between the heating capability in non-frosting QhpNI and the actual heating capability Qhpr is larger than a predetermined value.

4. The vehicle air conditioning device according to claim 2, wherein the controller calculates the required heating capability Qtgt on the basis of one of indexes indicating a temperature of the air flowing into the radiator, a temperature of the air flowing out from the radiator and a volume of the air passing the radiator, respectively, or any combination of the indexes, and indexes indicating specific heat of the air flowing into the radiator and a density of the air, and calculates the heating capability in non-frosting QhpNI on the basis of one of indexes indicating an outdoor air temperature, a refrigerant flow rate, an air volume in the air flow passage, a velocity, a volume of the air passing the outdoor heat exchanger, a voltage of an outdoor blower which passes the air through the outdoor heat exchanger, a temperature of the heat absorber, a number of revolution of the compressor, a refrigerant pressure of an outlet of the radiator, a refrigerant temperature of the radiator outlet, a refrigerant pressure of an inlet of the radiator, and a refrigerant temperature of the radiator inlet, respectively, or any combination of the indexes.

5. The vehicle air conditioning device according to claim 1, wherein the controller calculates the actual heating capability Qhpr on the basis of one of indexes indicating a temperature of the air flowing out from the radiator and a volume of the air passing the radiator, respectively, or a combination of the indexes, and indexes indicating specific heat of the air flowing into the radiator and a density of the air.

6. The vehicle air conditioning device according to claim 5, wherein the controller calculates the required heating capability Qtgt on the basis of one of indexes indicating a temperature of the air flowing into the radiator, a temperature of the air flowing out from the radiator and a volume of the air passing the radiator, respectively, or any combination of the indexes, and indexes indicating specific heat of the air flowing into the radiator and a density of the air, and calculates the heating capability in non-frosting QhpNI on the basis of one of indexes indicating an outdoor air temperature, a refrigerant flow rate, an air volume in the air flow passage, a velocity, a volume of the air passing the outdoor heat exchanger, a voltage of an outdoor blower which passes the air through the outdoor heat exchanger, a temperature of the heat absorber, a number of revolution of the compressor, a refrigerant pressure of an outlet of the radiator, a refrigerant temperature of the radiator outlet, a refrigerant pressure of an inlet of the radiator, and a refrigerant temperature of the radiator inlet, respectively, or any combination of the indexes.

7. The vehicle air conditioning device according to claim 1, wherein the controller calculates the required heating capability Qtgt on the basis of one of indexes indicating a temperature of the air flowing into the radiator, a temperature of the air flowing out from the radiator and a volume of the air passing the radiator, respectively, or any combination of the indexes, and indexes indicating specific heat of the air flowing into the radiator and a density of the air, and calculates the heating capability in non-frosting QhpNI on the basis of one of indexes indicating an outdoor air temperature, a refrigerant flow rate, an air volume in the air flow passage, a velocity, a volume of the air passing the outdoor heat exchanger, a voltage of an outdoor blower which passes the air through the outdoor heat exchanger, a temperature of the heat absorber, a number of revolution of the compressor, a refrigerant pressure of an outlet of the radiator, a refrigerant temperature of the radiator outlet, a refrigerant pressure of an inlet of the radiator, and a refrigerant temperature of the radiator inlet, respectively, or any combination of the indexes.

8. The vehicle air conditioning device according to claim 1,
wherein the radiator is disposed outside the air flow passage, and
the auxiliary heating means is constituted of a heating medium circulating circuit which has a heating medium-refrigerant heat exchanger to perform heat exchange with the radiator, a heating medium-air heat exchanger disposed in the air flow passage, an electric heater, and circulating means and which circulates a heating medium heated by the heating medium-refrigerant heat exchanger and/or the electric heater through the heating medium-air heat exchanger by the circulating means.

9. The vehicle air conditioning device according to claim 1,
wherein the auxiliary heating means is constituted of an electric heater disposed in the air flow passage to heat the air to be supplied into the vehicle interior.

10. The vehicle air conditioning device according to claim 9,
wherein the electric heater or the heating medium-air heat exchanger is disposed on a downstream side of the radiator to the flow of the air of the air flow passage.

11. The vehicle air conditioning device according to claim 9,
wherein the electric heater or the heating medium-air heat exchanger is disposed on an upstream side of the radiator to the flow of the air of the air flow passage.

12. The vehicle air conditioning device according to claim 1,
wherein the radiator is disposed in the air flow passage, and
the auxiliary heating means is constituted of a heating medium circulating circuit which has a heating medium-air heat exchanger disposed in the air flow passage, an electric heater, and circulating means and circulates a heating medium heated by the electric heater through the heating medium-air heat exchanger by the circulating means.

13. The vehicle air conditioning device according to claim 12,
wherein the heating medium circulating circuit has a heating medium-refrigerant heat exchanger which collects heat from the refrigerant passed through the radiator.

14. The vehicle air conditioning device according to claim 12,
wherein the controller executes a preliminary operation to start the heating by the heating medium circulating circuit, when the actual heating capability $Qhpr$ by the radiator does not run short, but a difference between a heating capability in non-frosting $QhpNI$ to be generated by the radiator when the outdoor heat exchanger is not frosted and a required heating capability $Qtgt$ which is the heating capability required for the radiator is reduced to a predetermined value.

15. The vehicle air conditioning device according to claim 14,
wherein the controller lowers the actual heating capability $Qhpr$ by the radiator as much as the heating by the heating medium circulating circuit, during the execution of the preliminary operation.

16. The vehicle air conditioning device according to claim 14,
wherein the controller limits an amount of a heating medium to be circulated through the heating medium-air heat exchanger, when a temperature of the heating medium flowing through the heating medium circulating circuit is lower than a predetermined value during the execution of the preliminary operation.

17. The vehicle air conditioning device according to claim 1, wherein the controller calculated the actual heating capability $Qhpr$ on the basis of one of indexes indicating a temperature of the air flowing out from the radiator and a volume of the air passing the radiator, respectively, or a combination of the indexes, and indexes indicating specific heat of the air flowing into the radiator and a density of the air.

\* \* \* \* \*